United States Patent
Graves et al.

(10) Patent No.: US 6,741,572 B1
(45) Date of Patent: May 25, 2004

(54) ARCHITECTURES FOR COMMUNICATION NETWORKS

(75) Inventors: Alan F. Graves, Kanata (CA); Christopher W. L. Hobbs, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/453,282

(22) Filed: Dec. 3, 1999

(30) Foreign Application Priority Data

Sep. 27, 1999 (CA) ............................................. 2283608
Sep. 28, 1999 (CA) ............................................. 2284298

(51) Int. Cl.⁷ ............................................. H04L 12/28

(52) U.S. Cl. ...................... 370/254; 370/255; 370/229; 370/235

(58) Field of Search ................................. 370/400, 401, 370/254, 255, 357, 389, 229, 235; 359/119; 713/201; 714/9; 709/238, 241

(56) References Cited

U.S. PATENT DOCUMENTS

| | | | |
|---|---|---|---|
| 5,671,304 A | 9/1997 | Duguay | 385/17 |
| 5,687,290 A | 11/1997 | Lewis | 395/3 |
| 5,781,537 A * | 7/1998 | Ramaswami et al. | 370/254 |
| 5,867,483 A | 2/1999 | Ennis, Jr. et al. | 370/252 |
| 5,956,165 A | 9/1999 | Fee et al. | 359/118 |
| 5,968,176 A * | 10/1999 | Nesset et al. | 713/201 |
| 6,032,266 A * | 2/2000 | Ichinohe et al. | 714/9 |
| 6,067,287 A | 5/2000 | Chung-Ju et al. | 370/232 |
| 6,094,646 A | 7/2000 | Runkler et al. | 706/52 |
| 6,243,396 B1 | 6/2001 | Somers | 370/469 |
| 6,414,767 B1 * | 7/2002 | Blair et al. | 359/119 |
| 6,490,248 B1 * | 12/2002 | Shimojo | 370/229 |

FOREIGN PATENT DOCUMENTS

EP    1 003 348 A2    5/2000    ......... H04Q/11/04

OTHER PUBLICATIONS

Saunders, S., "An Ethernet Switch with a View", Data Communications, McGraw Hill, New York, US, vol. 24, No. 4, Mar. 21, 1995, pp. 37–38, XP000502887 ISSN: 0363–6399.

Gopal, G.; Kim, C.; Weinrib, A.; "Dynamic Network Configuration Management", Communications, 1990. ICC 90, Including Supercomm Technical Sessions. Supercomm/ICC '90. Conference Record., IEEE International Conference on Apr. 16–19, 1990, pp. 302.2.1–303.2.7, vol. 2, IEEE, 1990.ff (List continued on next page.)

Primary Examiner—Douglas Olms
Assistant Examiner—Robert W. Wilson
(74) Attorney, Agent, or Firm—C. W. Junkin

(57) ABSTRACT

In a communications network comprising a plurality of interconnected nodes, each node comprises at least one network device requiring allocated transmission channels, a switch connected to the network device for configuring transmission channels connected to other nodes, and a configuration controller connected to the network device and to the switch for controlling configuration of the transmission channels. The configuration controller receives signals from the network device indicative of traffic load on the network device, processes the received signals to determine that reconfiguration of the transmission channels is favoured and determines a favoured reconfiguration of the transmission channels. The configuration controller also communicates with configuration controllers at other nodes to determine paths between nodes for reconfiguration of the transmission channels, and communicates with the switch, configuration controllers at other nodes and the network device to implement reconfiguration of the transmission channels. The network devices may be routers, data switches, servers or combinations thereof.

65 Claims, 10 Drawing Sheets

OTHER PUBLICATIONS

Egawa, T.; Komine, T.; Miyao, Y.; Kubota, F.; "QoS Restoration for Dependable Networks", Network Operations and Management Symposium, 1998. NOMS 98., IEEE, vol. 2, Feb. 15–20, 1998; pp. 503–512, vol. 2.

Dumortier, P., "Shortcut Techniques to Boost Internet Throughput Top–End IP Routerscan Handle Millions of Packets Per Second, But the Future Internet Will Need Much More Forwarding Capacity", Electrical Communication, Alcatel, Brussels, BE, Oct. 1, 1997, pp. 300–306.

Agrawal, R., et al., "Database Mining: A Performance Perspective", IEEE Transactions on Knowledge and Data Engineering, IEEE Inc., New York, U.S., vol. 5, No. 6, Dec. 1, 1993, pp. 914–925.

Chan, V.W.S. et al., "Architectures and Technologies For High–Speed Optical Data Networks", Journal of Lightwave Technology, IEEE, New York, U.S., vol. 16, No. 12, Dec. 1998, pp. 2146–2168.

Ghani, N. et al., "On IP–Over–WDM Integration", IEEE Communications Magazine, IEEE Service Center, Piscataway, N.J., U.S., vol. 38, No. 3, Mar. 2000, pp. 72–84.

Paschalidis, I. et al., "Congestion–Dependent Pricing of On–Line Internet Services", Proceedings of the 38$^{th}$ Conference on Decision and Control, Phoenix, Arizona USA, Dec. 1999, pp. 4026–4031.

Hellendoorn, H., "Fuzzy Control in Telecommunications", Siemens AG, Dept, ZT SN 4, D–81730 Munich, 1996 IEEE, pp. 444–448.

Goodman, Matthew S., "The LAMBDANET Multiwavelength Network: Architecture, Applications and Demonstrations", IEEE Journal on Selected Areas in Communications, vol. 8, No. 6, Aug. 1990, pp. 995–1004.

Monterey Networks Inc., "Dimensioning WDM Junctions in the Core Network", A White Paper. www.montereynets.com.

Monterey Networks Inc., "Scaling Optical Data Networks With Wavelength Routing", A White Paper. www.montereynets.com.

Monterey Networks Inc., "Scaling Optical Data Networks With Wavelength Routing", Monterey 20000 Series Wavelength Router™, May 1999.

Doshi, B.T., et al, "Multi–Protocol Over A Bytestream (MOB): A New Protocol Stack for Supporting Heterogeneous Traffic Over A Common Link", Bell Labs, Lucent Technologies, 101 Crawfords Corner Road, Holmdel, NJ 07733, USA.

Acampora, Anthony S., et al, "Terabit Lightwave Networks: The Multihop Approach", AT&T Technical Journal, Nov./Dec. 1987, vol. 66, Issue 6, pp. 21–34.

Zhang, Z., et al, "Performance Analysis of Multihop Lightwave Networks with Hot Potato Routing and Distance–Age–Priorities", IEEE Transactions on Communications, vol. 42, No. 8, Aug. 1994, pp. 2571–2581.

Brackett, C.A., "Dense Wavelength Division Multiplexing Networks: Principles and Applications", IEEE Journal on Selected Areas in Communications, vol. 8, No. 6, Aug. 1990, pp. 948–964.

Saunders, S., "An Ethernet Switch With a View", Data Communications, McGraw Hill, New York, Mar. 21, 1995, vol. 24, No. 4, pp. 37–38, XP000502887.

\* cited by examiner

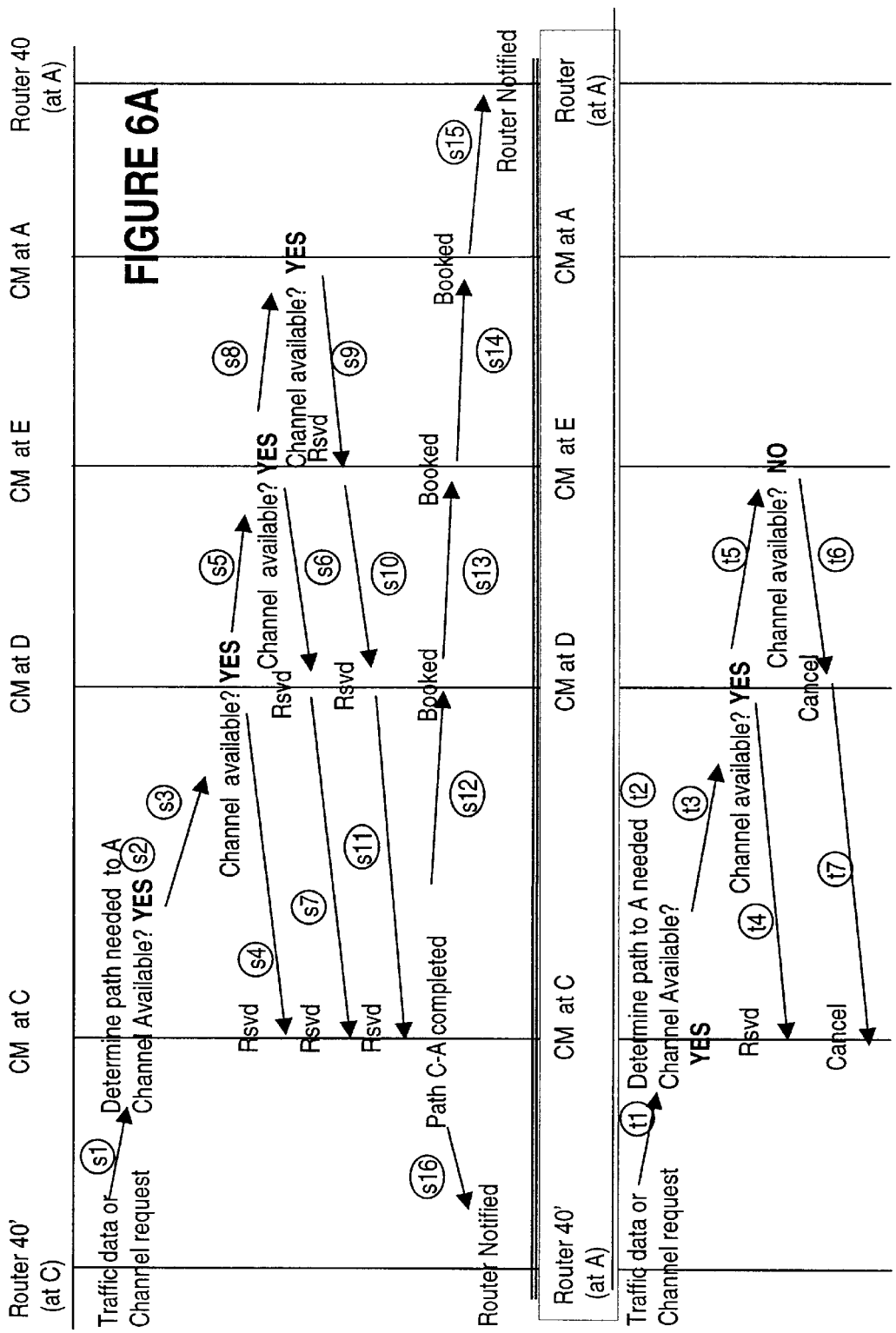

ARCHITECTURES FOR COMMUNICATION NETWORKS

FIELD OF THE INVENTION

The invention is directed to communication networks and in particular to architectures for a high performance data networks.

BACKGROUND OF THE INVENTION

Known routed data networks comprise a plurality of data routers interconnected by an incomplete mesh of transmission links. Traffic routed between geographically distant nodes on the routed network generally transits multiple routers at tandem nodes between source and destination nodes. As the network grows in geographic size and capacity, the number of nodes increases, and a larger percentage of the data routed by the network transits routers at multiple tandem nodes.

Unfortunately, routers are not well suited to the tandem routing functions they perform at tandem nodes. Because routers route data packets on a packet-by-packet basis, they must perform a great deal of processing to route a high bit rate data stream. Consequently, they require considerable processing power and contribute heavily to the cost of a routed data network, and their processing of each packet contributes to unpredictable end-to-end transmission delay across the network, which is problematic for some services.

Some of the problems of routed networks can reduced by providing transport layer switches at some nodes of the network. The transport layer switches are configured to provide high capacity end-to-end transmission paths between distant nodes that exchange enough traffic to justify the allocation of the high capacity paths, thereby diverting such traffic from tandem routers. Because the transport layer switches process traffic on a coarse granularity channel-by-channel basis rather than on a fine granularity packet-by-packet basis, they perform less processing on a high bit rate data stream than a tandem router. Consequently, they require less processing power and can contribute less cost and less unpredictable end-to-end delay than tandem routers on high capacity routes between distant nodes.

With transport layer switches performing tandem switching functions, network operators can define end-to-end transmission paths that logically connect the nodes in a full mesh, even though the nodes of the network are physically connected in an incomplete mesh or in interconnected rings.

The capacity required for each end-to-end transmission path is determined by network operators based on router traffic loads. The network operators change the capacity allocated to the end-to-end transmission paths based on traffic measurements and service requests using a centralized network management system that is connected to the transport layer switches. Today, this is a relatively slow process requiring human interaction, a change in capacity typically taking hours to days and, in some cases, months to implement.

Because the time needed to implement changes in capacity for end-to-end transmission paths is measured in hours to months, transmission capacity must be provided well ahead of need to avoid blocking due to inadequate capacity. Otherwise traffic in excess of the allocated capacity will be blocked, resulting in lost revenue and dissatisfied network users, or overflow traffic will be forced onto routers at tandem nodes, reducing the capacity of such routers which is available to local traffic.

Providing excess transmission capacity ahead of need increases the cost of the network. Failing to provide sufficient excess capacity to accommodate growth and fluctuations in traffic patterns can result in lost revenue. Consequently, network and service providers would welcome a network architecture that enables them to tailor the capacity of their data networks more responsively to the traffic demands of their network users.

SUMMARY OF THE INVENTION

This invention provides a novel architecture for a new generation of data networks. The novel architecture delivers more usable traffic throughput through a given level of transmission infrastructure when traffic patterns are unpredictable or rapidly fluctuating by dynamically and quickly allocating transmission capacity where it is needed.

In this specification, the term Agile Bandwidth Usage Device (ABUD) refers to any ABUD having time-varying transmission capacity requirements and being capable of providing signals indicative of transmission capacity needs.

ABUDs may use any form of switching or multiplexing, and may signal time-varying transmission capacity needs either directly by means of transmission capacity requests or indirectly by means of traffic data, such as traffic port occupancy statistics. Routers, Data Switches (for example ATM switches) and servers can all be ABUDs, for example.

One aspect of the invention provides a communications network comprising a plurality of interconnected nodes. Each of a plurality of the nodes comprises at least one ABUD, a switch connected to the ABUD for configuring transmission channels connected to other nodes, and a configuration controller connected to the ABUD and to the switch for controlling configuration of the transmission channels. The configuration controller receives signals from the ABUD indicative of transmission capacity needs of the ABUD, processes the received signals to determine that reconfiguration of the transmission channels is favoured and determines a favoured reconfiguration of the transmission channels. The configuration controller also communicates with configuration controllers at other nodes to determine paths between nodes for reconfiguration of the transmission channels, and communicates with the switch, configuration controllers at other nodes and the ABUD to implement reconfiguration of the transmission channels.

Networks as defined above automate interactions between ABUDs, such as routers, requiring allocated transmission channels and transmission channels provided to meet those requirements rapidly, without human intervention.

The ABUDs may be routers, data switches, servers or Time Division Multiplex (TDM) systems, or other ABUDs that require allocated transmission capacity.

The configuration controllers may receive signals comprising traffic data from the ABUD, and may process the received traffic data to determine that allocation of a transmission channel to a particular route is favoured. The configuration controllers may comprise a storage device for storing policy rules. The configuration controllers may be operable to download policy rules from a central management system and to apply the policy rules in processing the received traffic data to determine that allocation of a transmission channel to a particular route is favoured. In this case, the rapid reconfiguration capabilities of distributed automated transmission channel reallocation are combined with the ability to set network policy governing transmission channel allocation centrally.

Alternatively, the configuration controllers may receive signals comprising transmission channel allocation messages from the ABUD, and process the received transmission channel allocation request messages to determine that allocation of a transmission channel to a particular route is favoured.

Consequently, transmission channels are reconfigured automatically without human interaction in response to traffic patterns sensed at ABUDs.

The configuration controllers may determine a possible path for the transmission channel to be allocated. The configuration controllers may comprise a storage device for storing a map of network connectivity, and the configuration controller at the particular node may consult the map of network connectivity to determine the possible path for the transmission channel to be allocated.

The configuration controllers send transmission channel allocation request messages to configuration controllers at other nodes on the possible path and receive reply messages from the configuration controllers at other nodes on the possible path. The reply messages may indicate whether the transmission channel can be allocated at the other nodes. In response to reply messages indicating that the transmission channel can be allocated at all other nodes on the possible path, the configuration controllers may communicate with the switch, configuration controllers at other nodes and the ABUD to implement allocation of the transmission channel to the particular route. In this case, transmission channels are allocated only when an end-to-end path has been discovered and the required resources on that path have been reserved.

Alternatively, in response to a reply message indicating that the transmission channel can be allocated at an adjacent node on the possible path, the configuration controllers may communicate with the switch, the configuration controller at the adjacent node and the ABUD to implement allocation of the transmission channel to the particular route between the particular node and the adjacent node. In this case, transmission channels are allocated on a span-by-span basis in anticipation of path completion. This approach provides earlier initiation of transmission channel reallocation with some risk that packets may be lost in the network before a complete end-to-end path is established for the transmission channel.

The configuration controllers may communicate with configuration controllers at other nodes according to a connection-oriented protocol to temporarily reserve available transmission channels on a span-by-span basis until transmission channels are reserved for an entire end-to-end path, and to book for use the temporarily reserved transmission channels upon confirmation that available transmission channels are reserved for the entire end-to-end path. This approach provides guaranteed Quality of Service (QoS) on the end-to-end transmission path.

Another aspect of the invention provides a network node for a communications network. The node comprises at least one ABUD requiring allocated transmission channels, a switch connected to the ABUD for configuring transmission channels connected to other nodes, and a configuration controller connected to the ABUD and to the switch for controlling configuration of the transmission channels. The configuration controllers receive signals from the ABUD indicative of transmission capacity needs of the ABUD, process the received signals to determine that reconfiguration of the transmission channels is favoured and determine a favoured reconfiguration of the transmission channels. The configuration controllers communicate with configuration controllers at other nodes to determine paths between nodes for reconfiguration of the transmission channels, and communicate with the switch, configuration controllers at other nodes and the ABUD to implement reconfiguration of the transmission channels.

Yet another aspect of the invention provides a configuration controller for communicating with a ABUD requiring allocated transmission channels and a switch connected to the ABUD at a network node to configure transmission channels connected to other nodes of the network. The configuration controller comprises at least one processor, and at least one storage device connected to the at least one processor. The storage device stores instructions for execution by the processor, the instructions comprising instructions for receiving signals from the ABUD indicative of transmission capacity needs of the ABUD and processing the received signals to determine that reconfiguration of the transmission channels is favoured and to determine a favoured reconfiguration of the transmission channels. The configuration controller communicates with configuration controllers at other nodes to determine paths between nodes for reconfiguration of the transmission channels, and communicates with the switch, configuration controllers at other nodes and the ABUD to implement reconfiguration of the transmission channels.

The configuration controller may determine that a transmission channel is underutilized and may communicate with the switch, configuration controllers at other nodes and the ABUD to reallocate the underutilized transmission channel to a pool of spare transmission channels. This ensures that transmission channels allocated to serve temporary surges in traffic are made available for reallocation where needed after the temporary traffic surges subside.

Still another aspect of the invention provides a processor readable medium storing instructions for execution by a configuration controller. The instructions comprise instructions for receiving signals from the ABUD indicative of transmission capacity needs of the ABUD. The instructions further comprise instructions for processing the received signals to determine that reconfiguration of the transmission channels is favoured and for determining a favoured reconfiguration of the transmission channels. The instructions also comprise instructions for communicating with configuration controllers at other nodes to determine paths between nodes for reconfiguration of the transmission channels and for communicating with the switch, configuration controllers at other nodes and the ABUD to implement reconfiguration of the transmission channels.

Another aspect of the invention provides a method for operating a configuration controller at a node in a communications network. The method comprises receiving signals from the ABUD indicative of traffic load on the ABUD and processing the received signals to determine that reconfiguration of the transmission channels is favoured and to determine a favoured reconfiguration of the transmission channels. The method further comprises communicating with configuration controllers at other nodes to determine paths between nodes for reconfiguration of the transmission channels, and communicating with the switch, configuration controllers at other nodes and the ABUD to implement reconfiguration of the transmission channels.

Yet another aspect of the invention provides a router adapted to work with a configuration controller. The router comprises a traffic data accumulator operable to accumulate traffic data characterizing traffic on ports of the router, and a transmitter operable to transmit traffic information to a configuration controller. The router may further comprise a receiver operable to receive traffic information requests from the configuration controller, the transmitter being operable in response to receipt of the traffic information requests by the received to transmit traffic information to the configuration controller.

Embodiments of the invention provide dynamic re-allocation of transmission capacity in response to traffic patterns to improve utilization of transmission channels and reduce the need for over-provisioning of transmission capacity, thereby reducing network cost. The embodiments also enable faster response to network user requests for additional transmission capacity, so that network providers can deliver "bandwidth on demand".

Networks according to embodiments of the invention are easier to manage than current network architectures because transmission channel reallocation is performed by negotiation between nodes of the transport network. Moreover, the configuration controller provides a single interface to the node for a centralized network management system and maintains a single view of the node. Consequently, various manageable network entities each node do not need separate identities or interfaces to the centralized network management system.

Networks according to embodiments of the invention can use open and/or optimized/integrated interconnect, interfaces, transponders, etc. for multi-vendor inter-working.

The rapid dynamic re-allocation of transmission capacity in response to traffic patterns provided by networks according to embodiments of the invention can provide integrated failure protection which can be made optional at a per wavelength level. Network providers can provision the desired level of protection based on traffic value or Service Level Agreements (SLAs). Coordination of protection and restoration is also easier when transmission channel allocation is performed at the transport network level.

BRIEF DESCRIPTION OF THE DRAWINGS

Embodiments of the invention are described below, by way of example only, with reference to accompanying drawings, in which:

FIGS. 6A and 6B are message flow diagrams showing message flows used to discover physical paths for transmission channels in the network of FIG. 4.

DESCRIPTION OF EMBODIMENTS

Current Network Architectures

Figure 1:
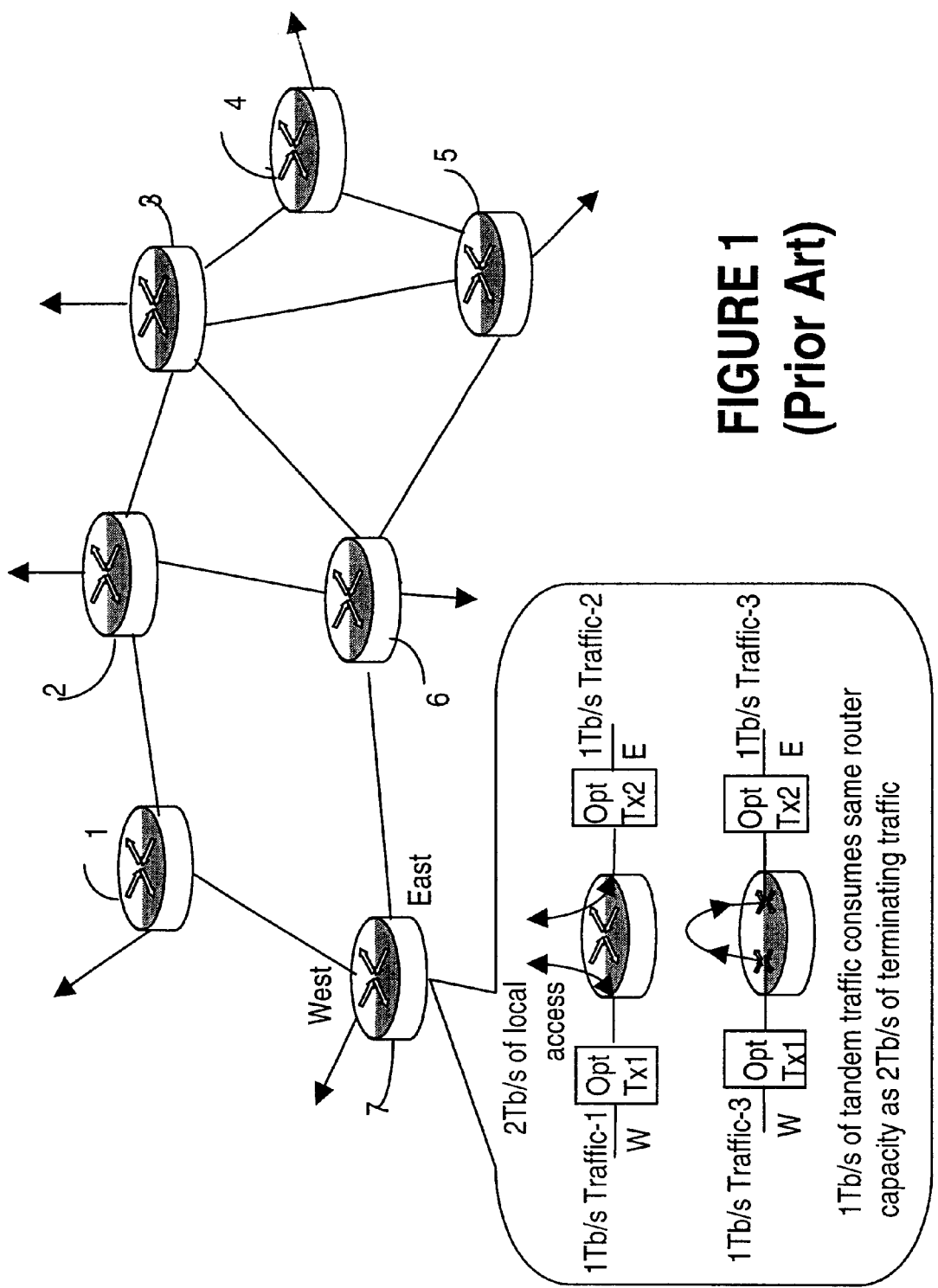
FIG. 1 is a block schematic diagram of a known routed network.

FIG. 1 shows a routed data network comprising a plurality of data routers 1–7 interconnected by an incomplete mesh of transmission links. The routers 1–7 add and drop traffic at their respective nodes, provide routing of through traffic on a packet-by-packet basis and provide service restoration for path failure. The insert near router 7 shows the router 7 in more detail, including optical transponders for connecting the router to optical transmission links which link the routers 1–7. The insert also shows through traffic passing through the router and add-drop traffic entering and leaving the network at the router. Each Tbps of through traffic consumes the same router resources as 2 Tbps of traffic terminating the router as shown in the insert.

Traffic routed between non-adjacent nodes on the routed network must be routed via routers at tandem nodes between source and destination nodes. For example, traffic routed from source router 1 to destination router 5 must be routed via some combination of routers 2–4 and 6–7 because there is no direct transmission link between router 1 and router 5. As the network grows in geographic size and capacity, the number of nodes increases, and a larger percentage of the data routed by the network must be routed through routers at multiple tandem nodes. In established networks of this type, typically 20%–30% of the traffic at an average node is terminating traffic added or dropped at the node, and 70%–80% of the traffic is tandem traffic passing through the node to another node.

The routers 1–7 are not well suited to the tandem routing functions they perform at tandem nodes. Each router routes all data packets on a packet-by-packet basis, whether they are packets to be added or dropped at the router, or packets to be routed through the router to another router. Consequently, the routers must perform a great deal of processing to route a high bit rate stream of through traffic to another router. This high level of processing for through traffic gives the routers a high cost to throughput ratio for through traffic, and reduces the capacity of the routers for traffic that is added and dropped at the router. Moreover, the high level of processing at each router for through traffic contributes to end-to-end transmission delay across the network that is problematic for some services.

Figures 2A, 2B:
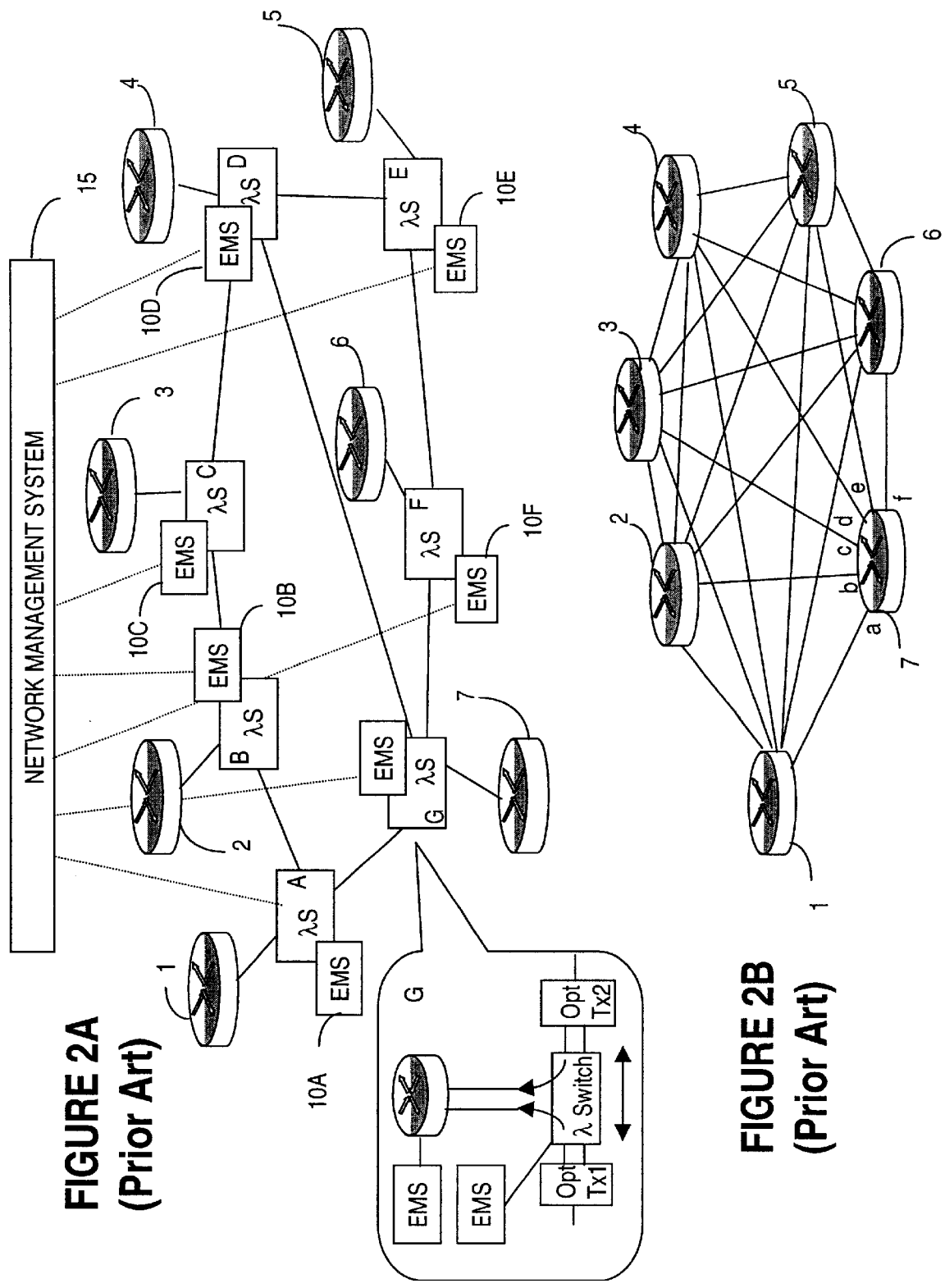
FIG. 2A is a block schematic diagram showing the physical connectivity in a switched wavelength network.
FIG. 2B is a block schematic diagram showing the logical connectivity of the switched wavelength network of FIG. 2A.

FIG. 2A shows an improved data network having both a router 1–7 and a transport layer switch in the form of a wavelength switch A–G at each node. The transport layer switches may switch optical transmission channels, for example SONET/SDH channels or wavelength channels in a Wavelength Division Multiplexed (WDM) optical transport network, as illustrated in FIG. 2A. (In FIG. 2A, the notation "λS" denotes "wavelength switch" or "lambda switch", the symbol lambda being commonly used to denote wavelength.)

The wavelength switches A–G add and drop wavelength channels to carrying local traffic to their associated routers 1–7, and pass through wavelength channels carrying traffic destined for routers at other nodes. All aspects of the wavelength switches A–G, including wavelength channel cross-connections, are quasi-statically provisioned via a centralized Network Management System (NMS) to provide high capacity end-to-end wavelength channels between distant nodes that exchange enough traffic to justify the allocation of the high capacity paths. These end-to-end wavelength channels divert end-to-end traffic from tandem routers.

Unlike routers which process traffic packet-by-packet, processing a packet headers to route each packet, the wavelength switches cross-connect wavelength channels without processing the content of the wavelength channels. Consequently, the wavelength switches need not perform the high speed processing that tandem routers require to process through traffic. Wavelength switches can therefore be made with higher throughput than routers, and can contribute less cost and less end-to-end delay than tandem routers on high capacity routes between distant nodes.

With transport layer switches performing tandem switching functions, network operators can define end-to-end transmission paths that logically connect the nodes in a full mesh, even though the nodes of the network are physically connected in an incomplete mesh. Thus, for example, the wavelength switches A–G of FIG. 2A can be quasi-statically provisioned with through channels at tandem nodes to interconnect the routers 1–7 in a complete logical mesh as shown in FIG. 2B, even though they are physically connected in an incomplete physical mesh as shown in FIG. 2A. (In many optical transport network implementations, the wavelength switches A–G are linked in multiple interconnected rings instead of an incomplete mesh, but the same principles apply to such interconnected ring networks.)

For known networks as shown in FIG. 2A, the capacity required for each end-to-end transmission link is determined by network operators based on router traffic loads as measured at the routers 1–7. Network operators responsible for the routers 1–7 monitor traffic on the routers and, when they judge that additional transmission capacity is needed to serve the routers, they request such additional transmission capacity from network operators responsible for the transport network. The transport network operators change the capacity allocated to the end-to-end transmission links using a centralized network management system 15 that is connected to the wavelength switches A–G via Element Management Systems (EMSs) 10A–10G. The EMSs 10A–10G consolidate and adapt information from the network or element under their control, and provide protocol translation between the protocols used by the network management system 15 and the managed network entities.

The routers 1–7 have no means for requesting additional or changed transmission capacity to another node. When the capacity of a provisioned wavelength channel terminating on a router is exceeded, the router will attempt to overflow traffic onto wavelength channels destined for other nodes, resulting in tandem routing at those other nodes. Such tandem routing diverts capacity of the tandem router from local traffic to through traffic and, if excessive and prolonged, can result in blocking of local traffic at the tandem router and consequent loss of revenue.

To avoid overflow of wavelength channels, router operators must observe router traffic parameters and infer from buffer overflow, packet discard rates, etc. at the router that the capacities of wavelength channels are being exceeded and excessive tandem traffic is being generated.

As noted above, the configuration of the transport network is centrally managed, so the router operators must ask transport network operators to effect changes in transmission capacity between routers. The transport network operators must ascertain the availability of transmission capacity to meet the request for additional transmission capacity and design an end-to-end path. The network operators change the configuration of the wavelength channels by changing cross-connect maps of the wavelength switches A–G, test the newly configured wavelength channel and put it in service, informing the router operator. The router operator must change forwarding tables at the router to enable the router to make use of the allocated end-to-end transmission capacity. Consequently, there is a need for interaction between router operators and transmission network operators, making the process time-consuming and error-prone. A reconfiguration of the wavelength switches A–G and the routers 1–7 to make better use of transmission capacity which is already installed in the network typically takes hours to days to implement.

Reconfiguration of the wavelength channels and router forwarding tables is also required when new equipment is installed in the network, and in response to some service requests from network users. Because the process for implementing changes in configuration of wavelength channels requires coordination between multiple operators and systems in a centralized network management environment, this process is prone to congestion when many changes are requested at once.

Since the time needed to implement changes in capacity for end-to-end transmission paths is measured in hours to months, transmission capacity must be provided well ahead of need to ensure that there is no blocking due to inadequate capacity. Otherwise traffic in excess of the allocated capacity will be blocked, resulting in lost revenue and dissatisfied network users, or overflow traffic will be forced onto routers at tandem nodes, reducing the capacity of those routers that is available to local traffic.

Figure 2C:
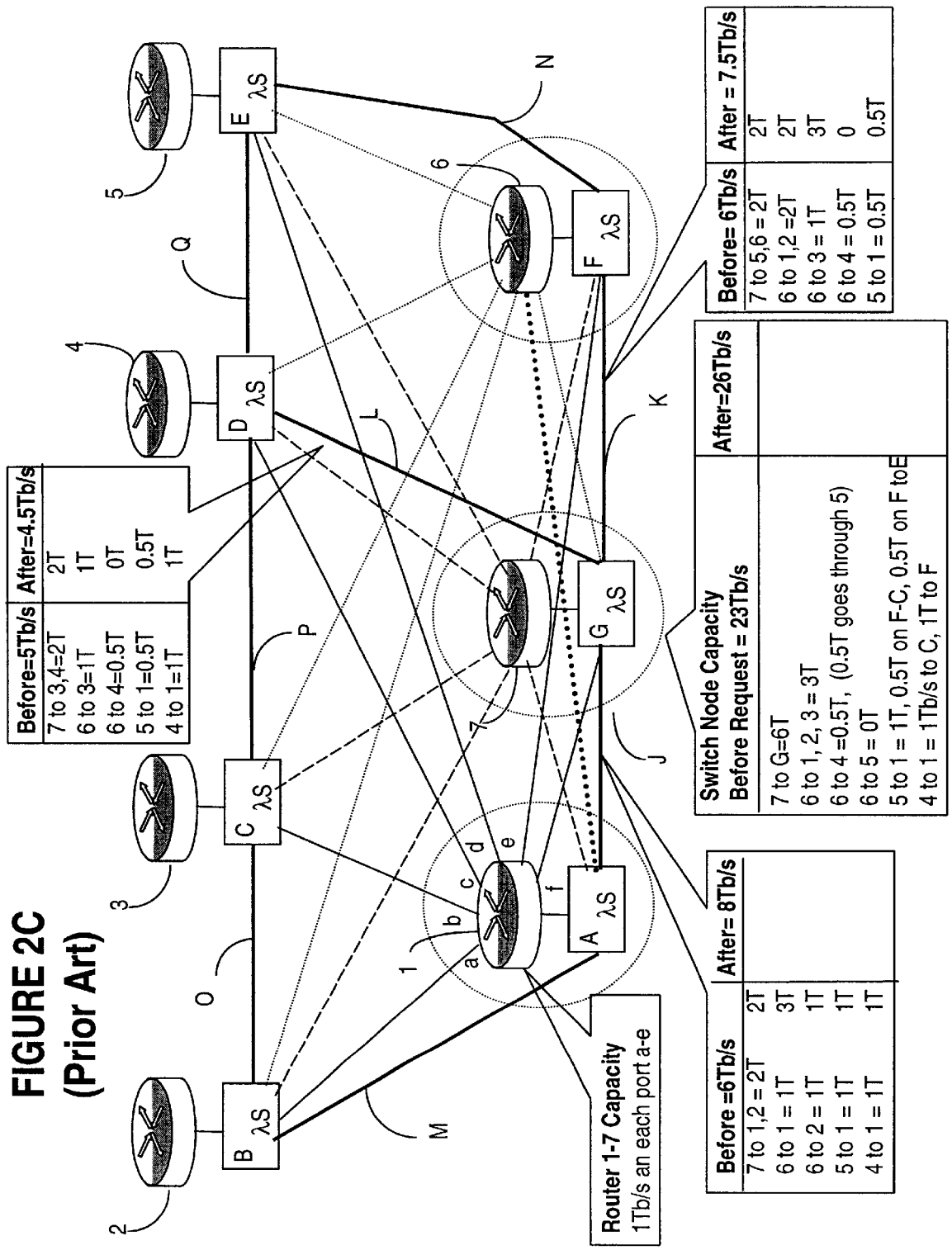
FIG. 2C is a block schematic diagram illustrating the effect of traffic fluctuations on the performance of the switched wavelength network of FIGS. 2A and 2B.

FIG. 2C illustrates the effect of a sudden surge in traffic on the operation of the network of FIGS. 2A and 2B. FIG. 2C assumes that each router 1–7 has a logical path to each other router, and that each logical path is provisioned to provide 1 Tbps of transmission capacity. The transmission capacity for the logical paths is provided on transmission facilities J–Q of the physical network, each of the transmission facilities linking transport layer switches of adjacent nodes, the transmission facilities defining an incomplete mesh.

The boxes at the top and at the bottom left and right of FIG. 2C shown in a left-most column how the logical paths are mapped onto physical transmission facilities L, J and K, these transmission facilities providing service to router 7. The left-most column of these boxes also shows resulting calculations for the required transmission capacities for these transmission facilities, taking into account all traffic for all routes on these links. The results of these calculations are L–6 Tbps; J–6 Tbps; and K–5 Tbps. The box at the bottom center of FIG. 2C shows in the left-most column the calculations for the required capacity of router 7 (6 Tbps) and of transport switch G (23 Tbps).

Figure 3:
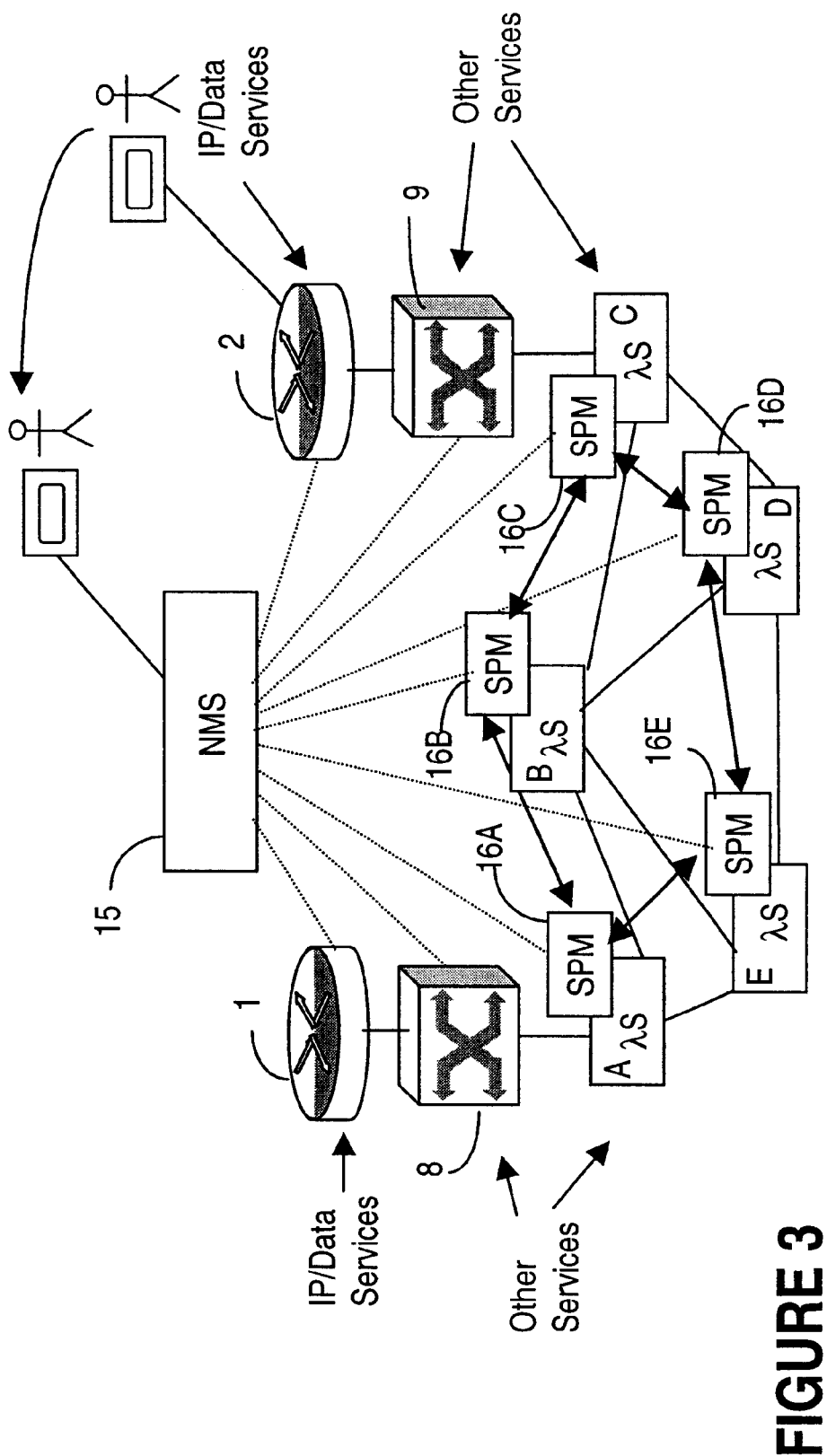
FIG. 3 is a block schematic diagram illustrating a switched wavelength network having distributed Self Provisioning Managers (SPMs)

Right hand columns in the boxes referred to above show the effect of a sudden demand for 3 Tbps of transmission capacity on the logical path between routers 1 and 6. Boxes to the bottom left and right of FIG. 3 provide calculations showing that the transmission capacity required for transmission facilities J and K rise from 6 Tbps to 8 Tbps and 7.5 Tbps respectively. The required capacity of transport switch G rises from 23 Tbps to 26 Tbps.

Unless the transmission facilities J and K are overprovisioned by 2 Tbps and 1.5 Tbps respectively and the transport switch G is overprovisioned by 3 Tbps, router 1 will attempt to route the traffic that cannot be handled by transmission facilities J and K and transport switch G by other routes. As noted above, this overflow traffic is tandem routed at other routers, consuming routing capacity at these routers that would normally be available for routing of traffic terminating at those routers.

There are three paths from router 1 to router 6:
1. router 1 to router 7 to router 6;
2. router 1 to router 2 to router 3 to router 4 to router 5 to router 6; and
3. router 1 to router 2 to router 3 to router 4 to router 7 to router 6.

Assuming that router 1 allocates the 2 Tbps of overflow traffic equally between all 3 paths an extra 0.67 Tbps per path must be handled by the routers on each path. Because the tandemed traffic both enters and leaves the tandem router on a trunk port, each Tbps of tandemed traffic consumes two Tbps of router capacity that could otherwise be used for traffic terminating on the router. Routers 2, 3, 4 and 7 are on two of the 3 paths and must handle an additional 2.67 Tbps each. Router 5 is on one of the paths and must handle an additional 1.33 Tbps. Consequently, the tandeming of the additional 2 Tbps of traffic consumes a total of 12 Tbps of router capacity that could otherwise be used to handle traffic terminating on the affected routers. This loss of router capacity could result in refusal of ingress traffic at the tandem routers with attendant loss of revenue and network user dissatisfaction.

Providing excess transmission capacity ahead of need increases the cost of the network. Failing to provide sufficient excess capacity to accommodate growth and fluctuations in traffic patterns can result in lost revenue. Consequently, network and service providers would welcome a network architecture that enables them to tailor the capacity of their data networks more responsively to the traffic demands of their network users.

FIG. 3 illustrates a further data network architecture. In this architecture, wavelength switches A–E are equipped with associated Self Provisioning Managers (SPMs) 16A–16E, which negotiate with each other to establish wavelength channels between the nodes. Router operators use Man Machine Interfaces (MMI) connected to the routers 1–2 and data switches 8–9 to view traffic data characterizing traffic on the routers 1–2 and data switches 8–9. When the router operators detect congestion (e.g. by observing high counts for dropped packets, buffer overflows, etc.), They contact transport network operators to request additional transmission capacity to relieve the congestion. The transport network operators use MMI of the centralized NMS 15 to determine what logical paths between routers should be allocated additional transmission capacity and use the MMI of the centralized NMS 15 to request allocation of the additional transmission capacity. The centralized NMS signals the SPM at the source node to seek out a physical path to the destination node along the logical path defined by the network manager. The SPMs negotiate according to known "pseudo-connectionless" techniques for negotiating physical transmission paths to determine a physical transmission path for the requested transmission capacity, and allocate additional transmission capacity along that physical path.

The architecture of FIG. 3 speeds up the process of providing additional transmission capacity to relieve congestion once it is determined when and where additional transmission capacity is required. However, this architecture does not reduce the need for interaction between human operators to determine when and where additional transmission capacity is required. Given that the time required for this human interaction is minutes to hours, the response of the network to changing traffic patterns, as controlled by its human operators, is still relatively slow.

The SPMs 16A–16E of FIG. 3 can be considered Transport Configuration Controllers (TCCs), where TCCs are devices which can, by communication with peer devices at other nodes, configure transmission channels based on instructions received from a centralized transport network management system. The centralized transport network management system determines the required end-to-end path and the role of the TCC is simply to implement the path.

Table 1 shows the estimated time required for implementing a wavelength channel reconfiguration for the network architectures discussed above, termed "agility" in this application.

TABLE 1

Agility for Network Architectures Discussed Above

| Network Type | Agility Range ($\mu$s) | Network Abilities |
| --- | --- | --- |
| Rings with patch-panel interconnect | $10^{13}$–$10^{11}$ | Controllably managed network with manual patching at intermediate nodes and equipment provisioning to work over provisioning of optimal equipment speed set-up |
| Centrally provisioned network with automated cross-connect from NMS, and human involvement. | $10^{11}$–$10^{9}$ | Time-of-day traffic engineered network |

Embodiments of Network Architectures According to the Invention

Figure 4:
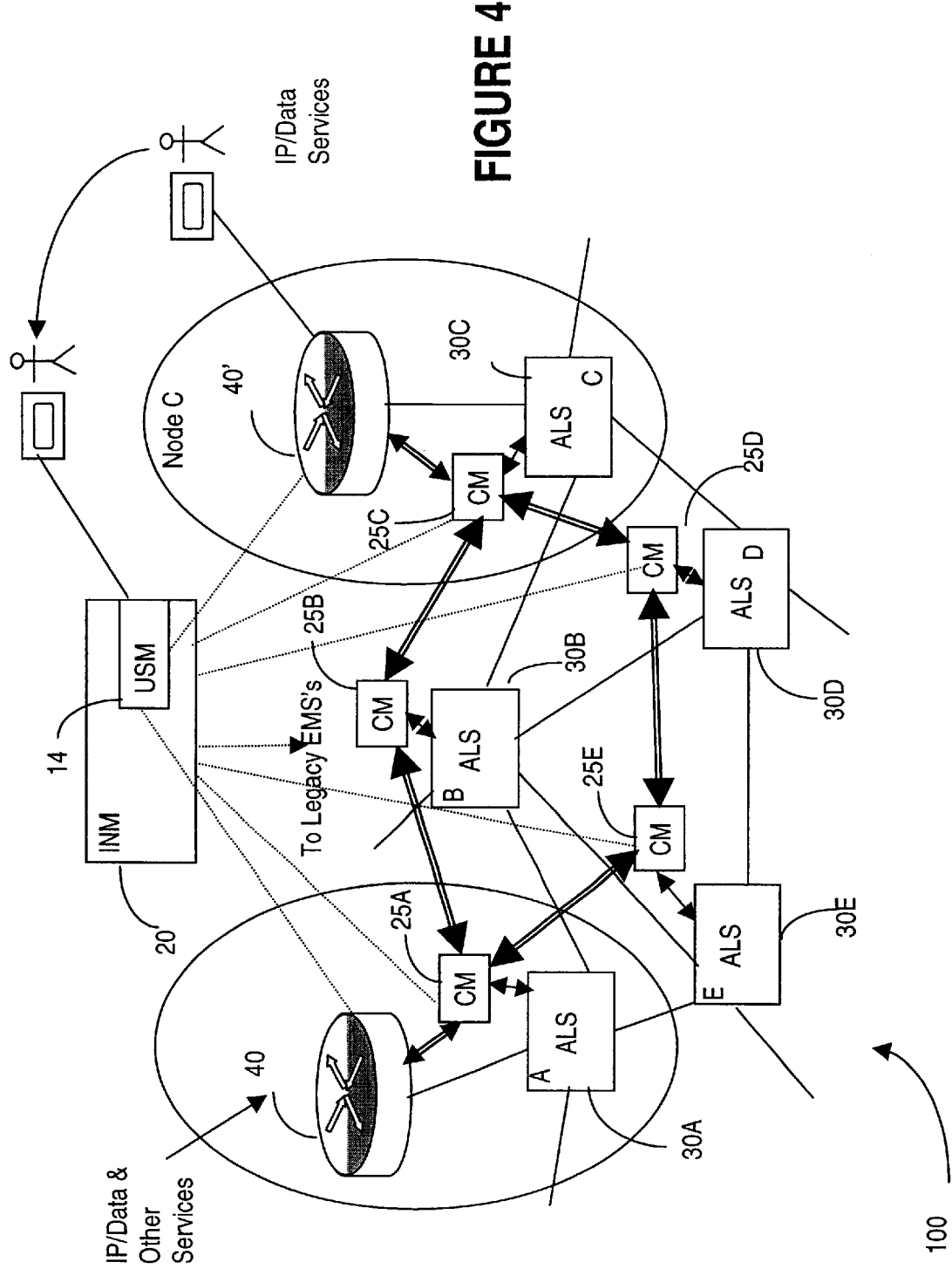
FIG. 4 is a block schematic diagram illustrating a network according to an embodiment of the invention.

FIG. 4 shows an Agile Lambda (wavelength) Network (ALN) 100 according to an embodiment of the invention. The ALN 100 comprises a plurality of ABUDs in the form of routers 40, 40' interconnected by a transport network. The transport network comprises a plurality of switches for configuring transmission channels in the form of Agile Lambda (wavelength) Switches (ALS) 30A–E physically interconnected by WDM transmission systems to form a layer 1 transport network. Each ALS 30A–E is located at a respective node of the transport network. A configuration controller in the form of a respective Contract Manager (CM) 25A–E is connected to each ALS 30A–E and controls the configuration of wavelength channels switched by its respective ALS 30.

The CMs 25A–E are interconnected as shown by the double-line arrows in FIG. 4. These interconnections between the CMs 25 enable the CMs to communicate with one another to set up source node to destination node wavelength channels in a manner to be described in more detail below. The interconnections between the CMs 25 could be implemented on a separate network, but preferably are implemented on an ALS-to-ALS overhead channel on one of the wavelength channels.

Figure 5:
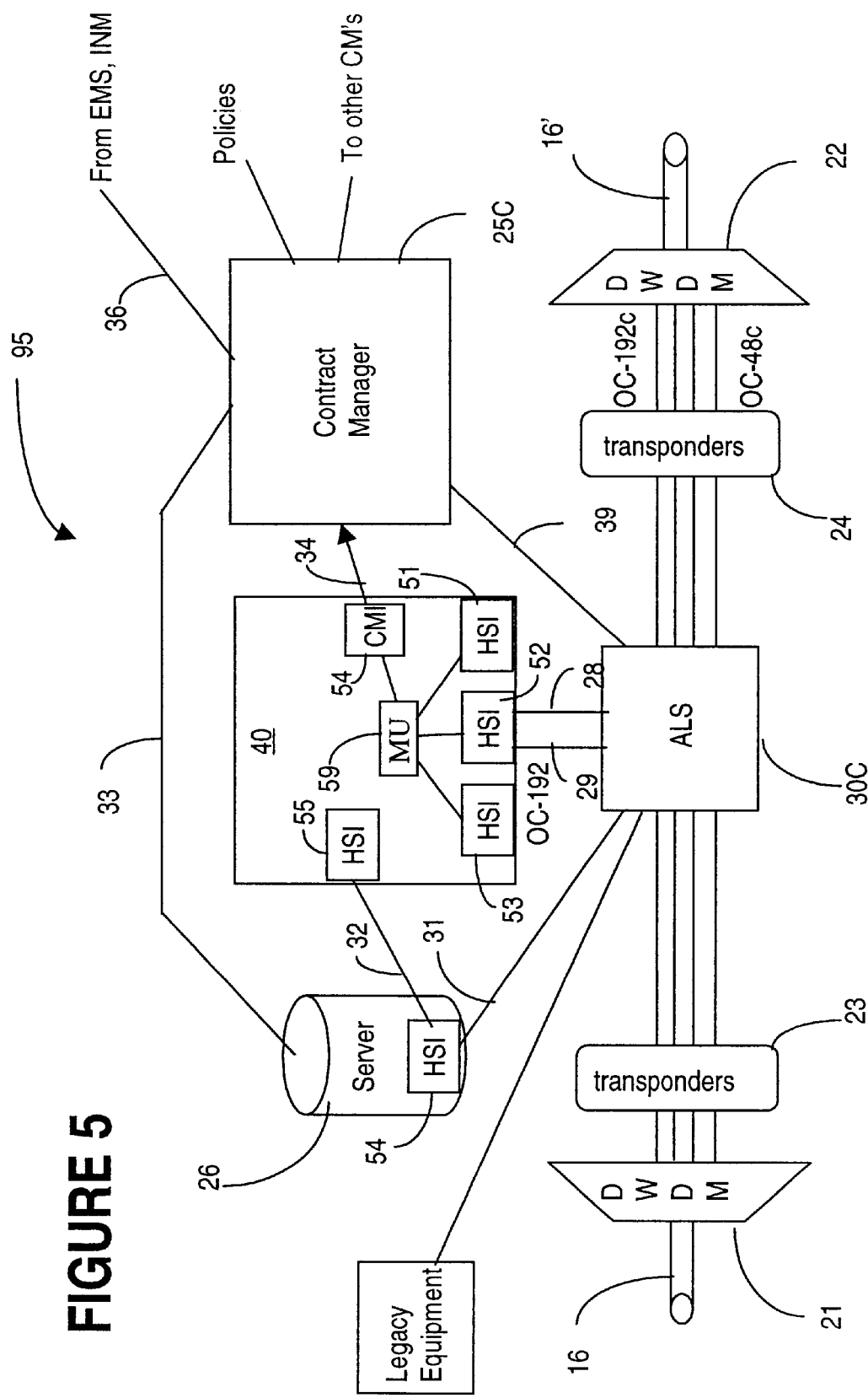
FIG. 5A is a block schematic diagram of a node of the network of FIG. 4.
FIG. 5B is a block diagram of a contract manager of the node of FIG. 5A.
Figure 5A:
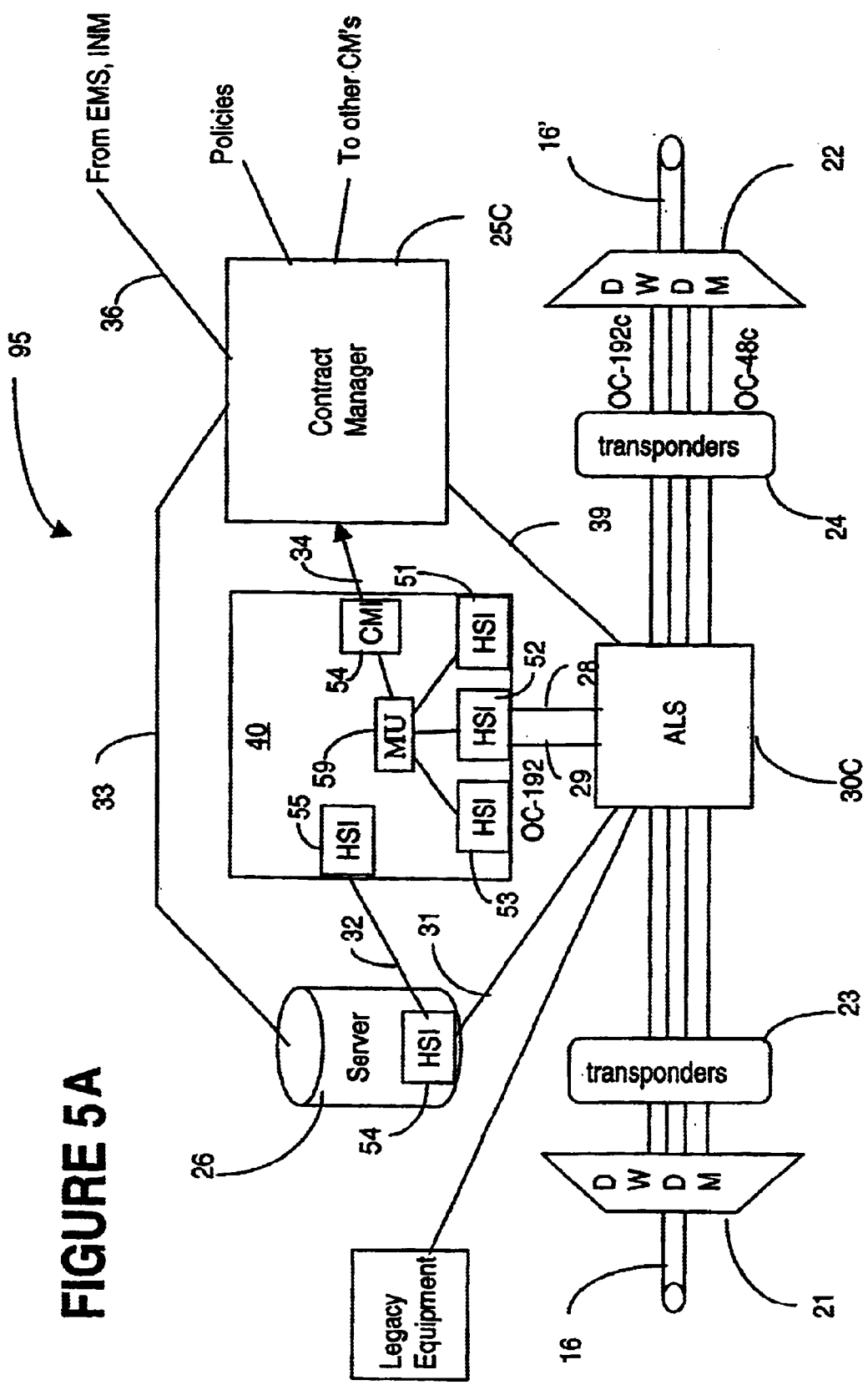

FIG. 5A illustrates a node of the ALN 100 in greater detail. Each node of the ALN 100 comprises an ALS 30, a router or data switch 40 connected to the ALS 30 and a CM 25 connected to both the router 40 and the ALS 30. The node shown in FIG. 5A also comprises a Server 26 which is also connected to the ALS 30 and the CM 25.

The ALS 30 receives incoming traffic via one or more optical fibers 16. The optical fiber 16 feeds a WDM demultiplexer 21 that separates incoming wavelength channels into separate optical paths. The wavelength channels may in general operate at different line rates and signal formats–for example, some of the wavelength channels may operate at OC-48 line rates while others operate at OC-192 line rates. The separated wavelength channels are coupled to respective transponders that convert the high performance optical format required for long reach outside plant transmission to short reach low cost cross-office traffic. The ALS 30 couples to the router 40 electrical signals corresponding to wavelength channels that are to be dropped at the router 40 for routing within the node. The router 40 couples electrical signals corresponding to wavelength channels that are to be added at the node to the ALS 30 for routing to an output fiber 16' via transponders 24, that convert the short-reach traffic to long-reach traffic at the appropriate wavelength. A WDM multiplexer 22 combines the wavelength channels onto the output fiber 16'. The ALS 30 also couples optical channels that are destined for other nodes directly to the output transponders 24 without coupling these signals to the router 40, so that these wavelength channels are "passed through" the node without being processed by the router 40. (While the fibers 16 and 16' are described as input and output fibers respectively and the signal handling is described in terms of signals passing through the node in one direction, the optical transmission systems will generally be bidirectional and the handling of signals travelling in the opposite direction through the node will be similar.)

The CM 25 is connected to the router or data switch 40 and the Server 26 to collect traffic data from these ABUDs and to update forwarding tables of the router or data switch 40 when reconfigurations of wavelength channels terminating on the router or data switch 40 are implemented. The CM 25 is also connected to the ALS 30 to control the configuration of wavelength channels switched by the ALS 30.

The CM 25 is a Network Configuration Controller (NCC) which has two classes of functions:

1. It interacts with ABUDs to autonomously determine what transmission capacity allocations are required on what end-to-end paths by the ABUDs; and
2. It interacts with peer devices at other nodes to configure transmission channels to meet the transmission capacity requirements identified in 1.

A TCC provides only the second of these functions.

The router 40 is provided with a monitoring unit MU 59 which accumulates traffic data in the form of tables of buffer fill values and buffer rate-of-fill values. The router 40 may provide the buffer fill and buffer rate values to the CM via a CM Interface (CMI) 54 feeding link 34, in which case the CM assesses the traffic data to determine whether, when and where additional transmission capacity should be allocated to the router 40. Alternatively, the router 40 may process the traffic data to determine whether, when and where additional transmission capacity should be allocated to the router, and may send a request for allocation of a wavelength channel to the CM via the CMI and link 34.

The router 40 also has high speed interfaces HSI 51, 52, 53 for transmission of traffic to and from the associated ALS 30.

Figure 5B:
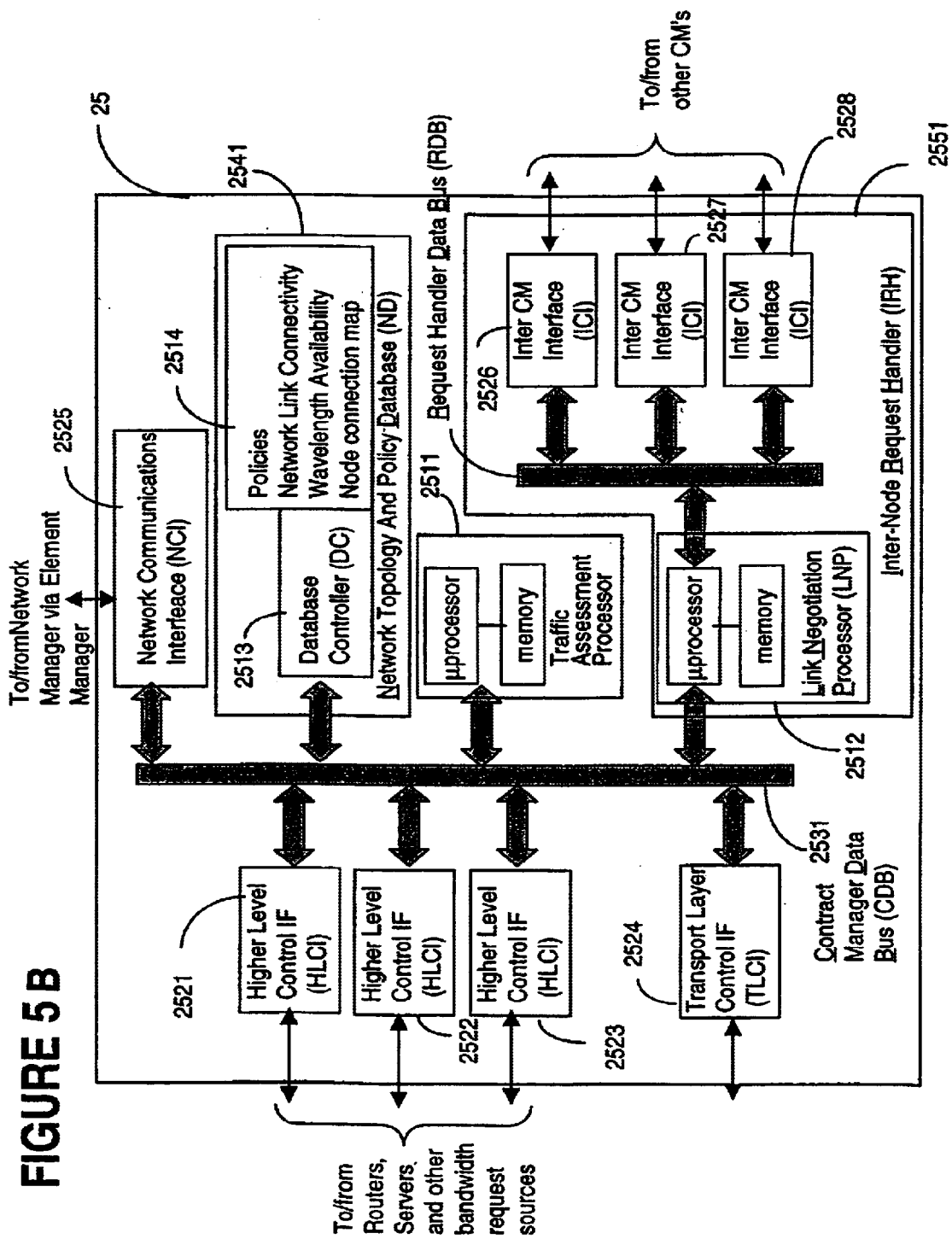

FIG. 5B is a block schematic diagram of one possible implementation of the CM 25. The CM 25 comprises an array of three processors 2511–2513, with a number of communications interfaces 2521–2528 and some custom applications programs. While FIG. 5B illustrates a CM implemented with 3 separate processors, the functions of these processors could be combined in software and run on a single suitably powerful processor. Alternatively, for CMs having very high processing requirements, each of the processors in this description could be replaced with an array of processors. Other distributed architectures are also possible.

The CM 25 comprises a number of Higher Level Control Interfaces (HLCI) 2521–2523, one or more Transport Layer Control Interfaces (TLCI) 2524, and a Network Communications Interface (NCI) 2525, all of which share access to the Contract Manager Data Bus (CDB) 2531. The CDB 2531 also allows for communication to, from and between the Traffic Assessment Processor (TAP) 2511, the Network Topology and Policy Database (ND) 2541 and the Inter Node Request Handler 2551. The HLCIs 2521–2523 are bidirectional data interfaces of any one of several known existing types which communicate to and from the higher layer network devices (such as routers, servers, data switches, etc.) that require the transport resources of the ALS 30 controlled by the CM 25. The TLCI 2524 (or TLCIs) are bidirectional data interfaces of any one of several known existing types which communicate to and from the ALS 30. The Network Communications Interface (NCI) 2525 is likewise a bidirectional data interface of any one of several forms which downloads network-based information from the centralized INM 20 to provide data needed by the CM 25. The NCI 2525 also uploads data from the CM 25 including traffic data and CM status indications.

The CM 25 downloads the following information from the INM 20:

1. network policies, which determine the rules which the CM 25 uses to allocate wavelength channels, or which provide modifications, usually parametric in nature, to the rules which the CM 25 uses to allocate wavelength channels;
2. a network connectivity map, which describes which nodes have direct links to which other nodes, this information being required locally for quickly finding alternatives for end-to-end paths without saturating the network with broadcast requests for allocation of wavelength channels and for pre-computing options on high churn routes to save processing time; and
3. which wavelengths channels and ports on the ALS 30 are reserved for particular uses (e.g. legacy provisioned equipment) or have failed and therefore cannot be included in the pool of spans that may be reconfigured to meet traffic ABUD demands;

The CM 25 polls the router 40 for traffic statistics from all the router network ports and receives the traffic data from the router 40 via the HLCIs 2521–2523, each HLCI being dedicated to a particular router 40 or other network device. This traffic data may take many forms, depending upon the policies used to determine when to allocate additional transmission capacity to a router port, but the data must be granular enough to specify traffic on particular router transport ports, so that the CM 25 can make decisions about the allocation of ALS wavelength channels to particular router transport ports. The data from the router 40 may take any one of several forms, for example:

port number, buffer fill level at time t=x, or port number, number of buffer overflows in the last time period, or port number, buffer fill, buffer rate of fill This data is passed over the Contract Manager Data Bus (CDB) 2531 to the Traffic Assessment Processor 2511 which processes the data to determine the traffic load behaviour of each of the ports of each router 40, and makes a decision as to whether action need be taken on any of these ports based on the network policies for allocating wavelength channels stored in the ND 2514.

For example, if the software run by the TAP 2511 determines that the buffer fill for a particular port is large, and the rate of fill for that buffer is also large and positive, the software may generate a request to allocate additional transmission capacity to offload that port. Conversely, if the software run by the TAP 2511 determines that the buffer fill for a particular port is large, but the rate of fill for that buffer is negative, the software may not generate a request for additional transmission capacity to offload that port.

The software running in the TAP 2511 determines what action to initiate by applying a series of rules to the traffic data collected for each router port. These rules are collectively known as policies and are downloaded from the INM 20 as a provisioning operation whenever the rules are changed or updated. The rules are stored locally in the ND 2541 of each CM 25 where they can accessed rapidly to ensure that traffic data can be assessed rapidly and corrective action can be taken quickly when required. A subset of the policies, governing real-time or high speed decisions may also be further downloaded into the memory of the TAP 2511 for even faster access.

Once the TAP 2511 has determined that a particular router port does require action, it determines what action to take under policy guidance, by first identifying the network path to which the affected port belongs. A network path is the set of all the ports that send traffic from a particular router to a specific destination node, so identifying the network path also identifies the destination node to which the port sends its traffic. At this point the software running on the TAP 2511 may optionally check some or all of the other ports in that network path for traffic occupancy, since, if the router is fairly sharing its bandwidth output over the ports of the network path, then the other ports of the network path may also be showing high occupancy. If one or more of the other ports of the network path is not showing high occupancy, there may be an internal router failure causing a loss of transmission ability on one or more ports.

Instead of computing transmission capacity needs on a port-by-port basis, the software running in the TAP 2511 may assemble the collected port traffic data into network path traffic data and analyze the network path traffic data where "network path" is defined as the configuration of all of the bandwidth available between two physically separated ABUD devices, over the transport network. By comparing the network path traffic behavior with norms and thresholds set in the policies, the software running on the TAP 2511 determines what action, if any, is required to make the traffic characteristics comply with the network policy applied to the network path.

Generally, when the software running on the TAP 2511 determines that a network path is overloaded, it generates a request to add one or more wavelength channels to the network path. This request is sent to the Link Negotiation Processor (LNP) 2512 which is part of the InterNode Request Handler (IRH) 2551.

The LNP 2512 runs software that identifies which paths need to be modified. The software running on the LNP 2512 determines the end destination of the network path requiring a change in its transmission capacity allocation by querying the ND 2541 which stores such data. The software running on the LNP 2512 then assesses, from the network link connectivity map, also stored in the ND 2541, which combinations of span-by-span connections reach the intended destination and hence which span directions exiting this CM's associated ALS 30 are likely to connect to the intended destination in a number of spans less than an upper limit set by the network policy.

The software running on the LNP 2512 could use any of several algorithms to determine the span directions likely to connect to the intended destinations in a reasonable number of spans. For instance, if a connection is required to a network node to the north-west of the source node, the software running on the LNP 2512 may initially seek solutions on spans heading north and west from the source node, but not on spans heading south and east from the source node. Alternatively, the software running on the LNP 2512 may search the data in the Network Link Connectivity map stored in the ND 2541 and determine the "m" different span combinations that conceptually could reach its destinations in the fewest spans. The software running on the LNP 2512 could then seek new wavelength path connections on spans connected to the source node that are included in those span combinations.

Having determined the end-to-end network paths (i.e. the combinations of individual links) that lead from the source node to the destination node, the software running on the LNP 2512 may apply further policy rules to determine which paths are most preferable, for example those with the smallest number of spans or those with the shortest route-km length. The software running on the LNP 2512 formulates and sends wavelength channel request messages to CMs 25 along the preferred paths (derived from network policy driven decisions) via the InterCM Interfaces (ICI) 2526–2528 as described in more detail below.

FIG. 6A is a message flow diagram illustrating message flows between a source router 40, a destination router 40' and several CMs 25 at intermediate nodes of a transmission path to be set up between the source router 40 and the destination router 40'. Initially, the CM 25 at node C collects traffic data from the router 40 at node C, shown as message s1. The CM 25 at node C determines, by applying network policies to the collected traffic data, that an additional wavelength channel is required on a path from router 40 at node C to router 40' at node A, as described above. The CM 25 at C further determines that a path having spans from node C to node D, from node D to node E and from node E to node A is a preferred path from node C to node A, as described above.

Each CM 25A–E maintains a status table storing the status of each wavelength channel span connected to its associated ALS 30A–E. At any point in time, each wavelength channel span is assigned one of the following status indications:

1. Available: i.e. this wavelength channel on this span is not allocated to any path and is not carrying traffic.

2. Temporarily Reserved: i.e. this wavelength channel is temporarily reserved for an end-to-end wavelength channel that has not yet been implemented. The temporarily reserved status is a temporary status with a finite life.

3. Booked: i.e. this wavelength channel is allocated to an end-to-end channel that has been implemented or will be implemented imminently. A booked wavelength channel stays booked unless and until a subsequent reconfiguration activity reallocates the wavelength channel, i.e. the booked status is a quasi-permanent status.

Because the CMs 25A–E may be setting up multiple end-to-end paths through the same nodes concurrently, the different paths may be contending for use of the same wavelength channel spans. The "temporarily reserved" status is provided to enable the CMs 25A–E to secure wavelength channels on spans needed to assemble an end-to-end path during the path discovery process. Once a CM 25A–E temporarily reserves a wavelength channel on a span for a particular end-to-end path, it will not reserve or book that wavelength channel on that span for another end-to-end path unless and until the first reservation is released.

When a wavelength channel on a span is temporarily reserved, a reservation timer is started. If the reservation timer expires before the wavelength channel is booked, the wavelength channel is released (i.e. returned to spare status). The use of reservation timers guards against the locking of unallocated wavelength channels into reserved status due to failures of the messaging procedures described below, since such locking would reduce the usable transmission capacity of the transport network until corrected.

The CM 25C at node C determines that a spare wavelength channel extending from node C to node D is available and temporarily reserves that spare wavelength channel. The CM 25C at node C then sends a wavelength channel request message s2 to the CM 25D at node D, specifying the source node (i.e. node C) the other intermediate nodes in the path (i.e. node E) and the destination node (i.e. Node A).

The wavelength channel request message may have a relatively simple message format, such as:
Node: C
Node Status: Source
Node: D
Node Status: Pass Through
Discover & Reserve Channel to Nodes: C, E
Notify Nodes: C
Node: E
Node Status: Pass Through
Discover & Reserve Channel to Nodes: D, A
Notify Nodes: D, C
Node: A
Node Status: Destination
Discover & Reserve Channel to Nodes: E
Notify Nodes: E, D, C On receipt of the wavelength channel request message s2, the CM 25D at node D determines whether the ALS 30D at node D has a spare wavelength channel from node D to node C and a spare wavelength channel from node D to node E. If the ALS 30D has both required spare wavelength channels, the CM 25D at node D temporarily reserves both spare channels and sends message s4 back to the CM 25C at node C to indicate that the spare channels are temporarily reserved. The CM 25D at node D also sends a wavelength channel request message s5 to the CM 25E at node E, similar to the initial wavelength channel request message s2.

On receipt of the wavelength channel request message s5, the CM 25E at node E determines whether the ALS 30E at node E has a spare wavelength channel from node E to node A and a spare wavelength channel from node E to node A. If the ALS 30E has both required spare wavelength channels, the CM 25E at node E temporarily reserves both spare channels and sends message s6 back to the CM 25D at node D to indicate that the spare channels are temporarily reserved. The CM 25D at node D forwards that message as message s7 to the CM 25C at node C to indicate that the required wavelength channels are temporarily reserved at node E. The CM 25E at node E also sends a wavelength channel request message s8 to the CM 25A at node A, similar to the initial wavelength channel request message s2.

On receipt of the wavelength channel request message s8, the CM 25A at node A determines whether the ALS 30A at node A has a spare wavelength channel from node A to node E. If the ALS 30A has the required spare wavelength channel, the CM 25A at node A temporarily reserves the spare channel and sends a message s9 back to the CM 25E at node E to indicate that the spare channels are temporarily reserved. The CM 25E at node E forwards that message as message s10 to the CM 25D at node D, and the CM 25D at node D forwards that message as message s11 to indicate that the required wavelength channel is temporarily reserved at node A.

The receipt of messages s4, s7 and s11 inform the CM 25C at node C that the required wavelength channels are temporarily reserved on all spans of the path. Consequently, on receipt of message s11, the CM 25C at node C sends a wavelength channel booking message s12 to the CM 25D at node D. The wavelength channel booking message s12 specifies the source node (i.e. node C) the other intermediate nodes in the path (i.e. node E) and the destination node (i.e. Node A). The CM 25C at node C also signals the ALS 30C at node C to configure the temporarily reserved wavelength channel to the requested path.

As a double-check, the CM's A, G, D may or may not send a booking confirmation message back to C. This is not shown in FIG. 6A.

On receipt of the wavelength channel booking message s12, the CM 25D at node D books the temporarily reserved channels and signals the ALS 30D at node D to configure the temporarily reserved wavelength channels to the requested path. The CM 25D at node D also forwards the wavelength channel booking message as message s13 to the CM 25E at node E.

On receipt of the wavelength channel booking message s13, the CM 25E at node E books the temporarily reserved channels and signals the ALS 30E at node E to configure the booked wavelength channels to the requested path. The CM 25E at node E also forwards the wavelength channel booking message as message s14 to the CM 25A at node A.

On receipt of the wavelength channel booking message s14, the CM 25A at node A books the booked channel and signals the ALS 30A at node A to configure the temporarily reserved wavelength channel to the requested path.

Once the ALSs 30 at all nodes have been reconfigured to implement the requested wavelength channel, the link integrity end-to-end may be checked by inserting a path check message into the transmission overhead either in the ALS 30C at node C or in the router transmission port at node C, and by checking that this path check message is received at the appropriate port of the router 40' at the destination node. Following this optional (but prudent) step, the CM 25A at node A sends message s15 to the router 40' at node A to amend the forwarding tables of the router 40', and the CM 25C at node C sends message s16 to the router 40 at node C to amend the forwarding tables of router 40 to bring the new wavelength channel into service.

FIG. 6B illustrates message flows in the case that the ALS 30 at one of the nodes on a requested path does not have the spare wavelength channels required to construct the requested path. The message flows t1 to t5 in FIG. 6B correspond to the message flows s1 to s5 respectively in FIG. 6A. On receipt of the wavelength channel request message t5, the CM 25E at node E determines that the ALS 30E does not have one or both of the spare wavelength channels needed to construct the requested path. The CM 25E at node E sends cancellation message t6 to the CM 25D at node D. On receipt of the cancellation message, the CM 25D at node D cancels the reservation of spare wavelength channels for the requested path. The CM 25D at node D also forwards the cancellation message as message t7 to the CM 25C at node C. The CM 25C at node C also cancels the reservation of a spare wavelength channel at node C.

The CM 25 at the source node requiring additional transmission capacity to a destination node may send wavelength channel request messages on multiple paths concurrently or sequentially to attempt to set up the required wavelength channel. The CM 25 may accept the first path for which it receives messages confirming that all nodes on the path have temporarily reserved the required spare wavelength channels. Alternatively, the CM 25 at the source node may wait until it receives messages indicating the results of attempts to temporarily reserve the required spare wavelength channels on all requested paths, and then select a preferred path based on minimum number of spans, use of spans with greatest spare capacity, cost or other criteria defined by the network policy.

If the CM 25 at the source node sends messages on multiple paths concurrently to attempt to set up a required wavelength channel, the CM 25 at the source node must also send release messages to CMs 25 at all other nodes on non-booked paths to cancel reservations of spare wavelength channels that will not be required due to non-booking of the paths connecting through those nodes. The CMs 25 receiving the release messages must respond to those messages by releasing the temporarily reserved wavelength channels.

Other more generic broadcast-based message structures may be used for wavelength channel request messages. While such broadcast techniques may marginally improve the set up speed of requested wavelength channels, this would be achieved at the expense of much more temporary reservation/cancellation activity.

In the example shown in FIG. 6A, the booking messages s12, s13 and s14 could be eliminated if the temporarily reserved messages s9, s10 and s11 initiated by CM 25A at the destination node also acted as booking messages. This would result in faster set up of requested wavelength channels, but the wavelength channel request messages resulting from a particular traffic overload condition would need to be assigned a common identifier that the CM at the destination node could use to avoid implementing redundant wavelength channels. The CM at the destination node would need to send booking messages back toward the source node in response to only the first wavelength channel request message reaching the destination node. On receipt of subsequent wavelength channel request messages specifying the same identifier, the CM at the destination node would send release messages back toward the source node.

The TAP 2511 also runs a background task to monitor the traffic fill in each network path, and, as it falls below values set in the downloaded policies, to initiate action to reduce transmission capacity on network paths for which the allocated transmission capacity is underutilized. The software running on the TAP 2511 may reduce the number of wavelength channels allocated to a network path if the traffic in that network path falls below a certain value for a certain period of time. For example, if the agility of the ALN 100 is such that a network path can be resized in 100 ms, and a network path allocated 4 wavelength channels has been at a peak occupancy of less than 50% for 10 minutes, then it is probably safe to recover at least one wavelength channel and probably two. The recovered wavelength channels are held in reserve for re-allocation to whichever network path needs them. In practice one method would be to recover and reallocate the paths so as to maintain all network paths at the same level of normalized traffic loading where the normalized traffic loading is defined by the policies. One possible definition of normalized traffic loading is "the used traffic capacity divided by the overall network path capacity". However, the definition may be made non-linear considering that statistics of large network paths differ from statistics of small network paths, so the small network paths may be deemed to be at a different level of normalized traffic loading at the same percentage occupancy (both due to the rate at which their fill can change and the effects of the provisioning modularity).

The policies are input by the network operator, and are stored centrally at the INM 20. The INM 20 downloads these policies to the CMs 25A–25E at regular intervals, or when they change, and immediately after a policy update.

The above description states that the CMs 25 collect raw traffic data from the routers 40 and process that data to determine whether additional wavelength channels are required between source nodes and destination nodes. Alternatively, the routers 40 could process the raw traffic data and provide processed traffic data to the CMs 25. The traffic data processing done by the routers could be sufficient for the routers to issue requests for wavelength channels when traffic data processing software run by the routers determines that such wavelength channels are need. In this case, the routers 40 would need to receive policy downloads from the INM 20, possibly via the CMs 25.

Once the decision has been made in the CM 25C at source node C to request allocation of a wavelength channel, the delay elements, in series, for allocating the wavelength channel might be, for example (with reference to FIG. 6A):

| | |
|---|---|
| Path search in ND of CM 25C | ~25 msec |
| Message formatting, transmission in ICI of CM 25C | <1 msec |
| Time of flight to CM 25D | ~1.5 msec |
| (assume 300 km with optical amplifiers) | |
| Path availability check at CM 25D | 10 msec |
| Message formatting, transmission in ICI of CM 25D | <1 msec |
| Time of flight to CM 25E | ~1.5 msec |
| (assume 300 km with optical amplifiers) | |
| Path availability check at CM 25E | 10 msec |
| Message formatting, transmission in ICI of CM 25E | <1 msec |
| Time of flight to CM 25A | ~1.5 msec |
| (assume 300 km with optical amplifiers) | |
| Path availability check at CM 25A | ~5 msec |
| Reserved message formatting, | <1 msec |
| trans in ICI of CM 25A | |
| Time of flight from CM 25A to CM 25C | 6.5 msec |
| with tandeming at CM 25E/25D | |
| Decision to convert reserved to booked at CM 25C | 1 msec |
| Message formatting, transmission at CM 25C | <<1 msec |
| Time of flight from CM 25C to CM 25A | 6.5 msec |
| with tandeming at CM 25D/25D | |
| TOTAL for 900 km 3 hop system | ~73.5 msec |

Consequently, after approximately 73.5 msec, the CMs 25A–25E along the chosen path can set up the appropriate cross-points in their associated ALSs 30A–30C, do an optional integrity check and cut into service. The 73.5 msec set-up delay can be reduced to approximately 50 msec if the paths are precomputed and the source CM 25C needs merely to read them from storage. Alternatively or in addition, the 73.5 msec set-up delay can be reduced by "pipelining" some of the steps that are assumed to be sequential in the above calculation.

Similar calculations for a path extending across a typical metropolitan area suggest that a set-up delay of approximately 15–25 msec is possible with precomputed paths. Further calculations for a path extending across North America (assuming 5 spans totaling 1000 km) suggest that a set-up delay of 150 msec is possible for a transcontinental reconfiguration of a wavelength channel.

As described above, the CMs 25A–25E ensure that the required wavelength channel capacity is available on all spans of a path before initiating reconfiguration of the required wavelength channel on that path. This approach provides wavelength channel reallocation delays that are adequate for policy rules that operate over multiple traffic measurement intervals. For example, a policy rule may stipulate that an additional wavelength channel is to be allocated if the number of buffer overflows over a number of consecutive measurement intervals exceeds a threshold value. This policy rule permits some buffer overflows but prevents the number of overflows from being excessive.

However, to avoid buffer overflows completely, the policy rules might require that an additional wavelength channel be allocated when a high buffer fill and a high buffer fill rate are detected in a single measurement interval. The wavelength channel reconfiguration time must be extremely short for this policy rule to be effective in avoiding buffer overflow.

Figure 7:
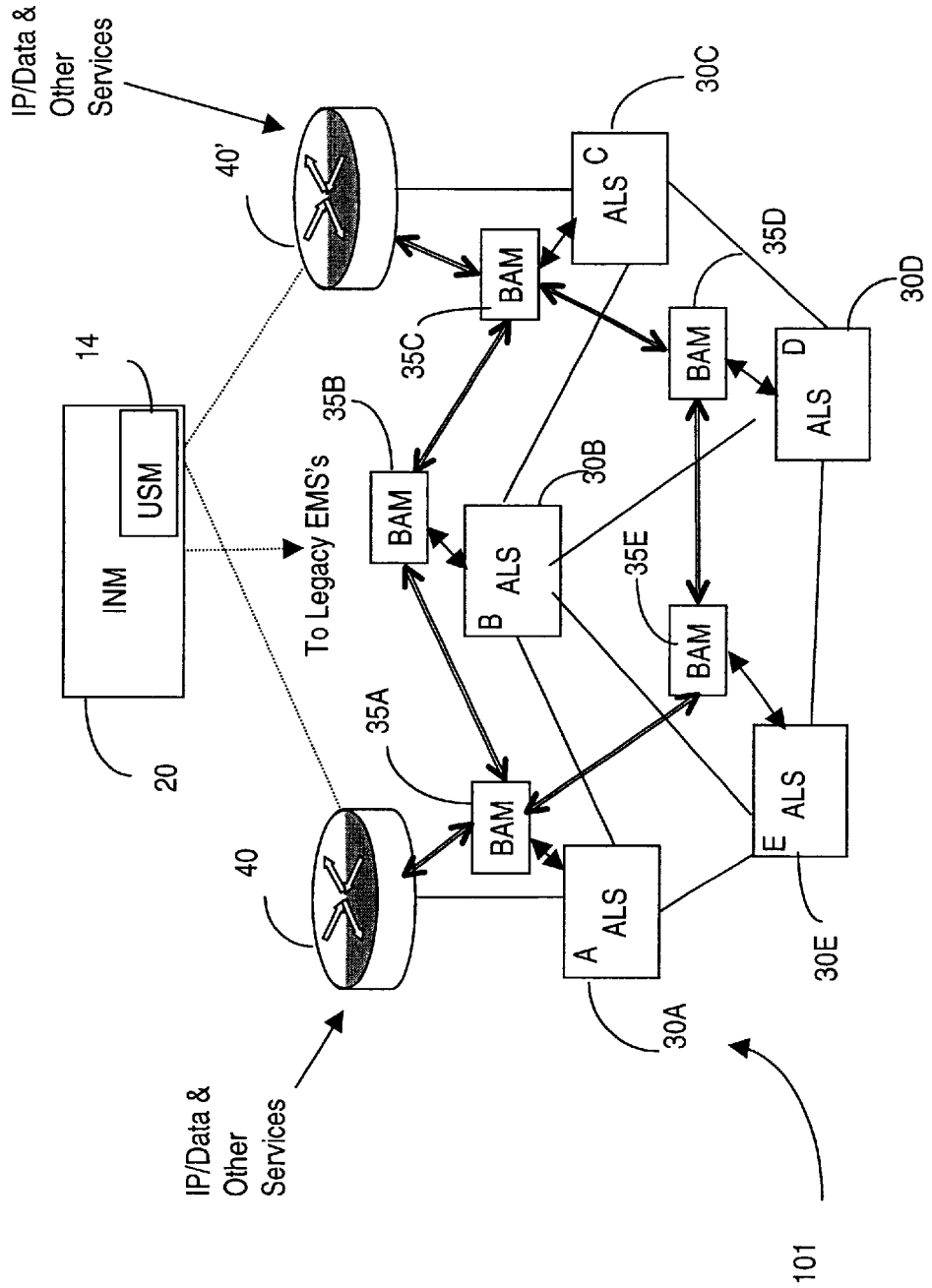
FIG. 7 is a block schematic diagram illustrating shows another embodiment of the invention.

FIG. 7 shows another embodiment of the Agile Lambda (wavelength) Network 101. In this embodiment, the CMs 25A–25E are replaced with configuration controllers in the form of Bandwidth Allocation Managers (BAMs) 35A–35E. The functions of the BAMs 35A–35E are generally similar to those of the CMs 25A–25E. However, the BAMs 35A–35E are adapted to an ALN 101 that requires even greater agility.

To further reduce the time needed to respond to traffic overloads, the BAMs 35A–35E are programmed to begin reconfiguring wavelength channels span-by-span as soon as the BAMs determine that the required wavelength channel capacity is available on each span (i.e. before the BAMs determine that the required wavelength channel capacity is available on every span of the preferred path). Under this method of operation, traffic is applied to the first reconfigured spans of the requested wavelength channel before all spans of the requested wavelength channel are reconfigured. If the remaining spans of the requested wavelength channel cannot be reconfigured or cannot be reconfigured fast enough, some traffic may be lost. However, in packet data systems, some of the lost data may be recovered through packet retries. Moreover, on average the advantages of earlier relief at the overloaded router ports are expected to outweigh the disadvantages of packets lost in the network and resulting packet retries. This is particularly true when the alternative to the relatively low probability of losing data in the network is the guaranteed loss of data when the output buffer at the originating router overflows.

One benefit of the ability to rapidly reconfigure the wavelength channels between the ALSs 30 can be demonstrated with reference to FIG. 2C. As described above, FIG. 2C illustrates that, in one example, the tandeming of 2 Tbps of overflow traffic through routers consumes 12 Tbps of router capacity that could otherwise be used for traffic terminating on the routers. This loss of router capacity could result in refusal of ingress traffic at the tandem routers with attendant loss of revenue and network user dissatisfaction.

However, the ALN 100 of FIG. 4 can rapidly reconfigure wavelength channels between ALSs 11–17 when the overflow traffic is detected. In particular, spare wavelength channels on the following paths can be allocated to the route connecting router 1 to router 6:

1. switch A to switch G to switch F
2. switch A to switch B to switch C to switch D to switch E to switch F
3. switch A to switch B to switch C to switch D to switch G to switch F So long as the total spare transmission capacity on these 3 paths exceeds 2 Tbps, the overflow traffic can be handled by the ALSs A–G without tandeming through the routers 1–7.

Even if the spare capacity on these paths cannot accommodate all of the 2Tbps of overflow traffic, any overflow traffic it can accommodate reduces the tandem traffic that must be handled by the routers 1–7, and given the multiplier effect of tandem routing, this can have a significant effect on network performance.

Moreover, if routers 1 and 6 are handling 3 Tbps of traffic routed between routers 1 and 6 and each has a total capacity of 6 Tbps, these routers will not have the processing capacity to process 1 Tbps of traffic for each of the other 5 nodes as assumed in FIG. 3. Consequently, some of the other paths terminating on routers 1 and 6 will be underutilized and, if the control algorithms of the ALN 100 distributed among the CMs 25 recognize that underutilization, some of the underutilized transmission capacity can be reallocated to the path between routers 1 and 6 to handle the overflow traffic.

Table 2 shows the estimated time required for implementing a wavelength channel reconfiguration for the Agile Lambda (wavelength) Network (ALN) architectures discussed above, termed "agility" in this application. The agility ranges and network abilities in Table 2 can be compared to those in Table 1 to gauge the impact of the embodiments of the invention.

TABLE 2

Agility for Network Architectures According to Embodiments

| Network Type | Agility Range ($\mu s$) | Network Abilities |
|---|---|---|
| Distributed control networks with end-to-end path negotiation | $2 \times 10^8$– $5 \times 10^4$ | Self provisioning networks with distributed provisioning, true bandwidth on demand (on human time-scale). Possible merge of circuit set-up protection/-restoration. |
| Distributed control networks with span-based path negotiation. | $10^6$– $5 \times 10^3$ | Merge circuit set-up, protection/restoration Eliminates/separates layer 2, merges into layer 3 |

Because the fastest reconfiguration times shown in Table 2 are of the same order of magnitude as protection switching times in protected transmission systems, the provision of agile wavelength capability as described above could remove the need for separate protection switching systems, effectively merging the protection and restoration mechanisms of the transmission network with the channel provisioning mechanisms.

While the invention has been described with reference to particular example embodiments, further modifications and improvements that will occur to those skilled in the art, may be made within the purview of the appended claims, without departing from the scope of the invention in its broader aspect. The features described above may be combined in other combinations than those disclosed above without departing from the principles of the invention.

We claim:

1. A communications network, comprising a plurality of interconnected nodes, each of the plurality of said nodes comprising:

at least one Agile Bandwidth Usage Device (ABUD);

a switch connected to the ABUD for configuring transmission channels connected to other nodes; and a configuration controller connected to the ABUD and to the switch for controlling configuration of the transmission channels, the configuration controller being operable:

to receive from the ABUD buffer statistics characterizing the fill of buffers connected to output ports of the ABUD;

to process the received buffer statistics to determine that a modified allocation of the transmission channels is favoured and to determine a favoured modified allocation of the transmission channels;

to communicate with configuration controllers at other nodes to determine a paths between nodes for implementation of the favoured modified allocation of the transmission channels; and to communicate with the switch, configuration controllers at other nodes and the ABUD to implement the favoured modified allocation of the transmission channels according to the determined path.

2. A network as defined in claim 1, wherein the ABUD at a particular node is selected from a group consisting of routers, data switches, servers.

3. A network as defined in claim 1, wherein the configuration controller at a particular node is operable:
to receive signals comprising traffic data from the ABUD; and
to process the received traffic data to determine that allocation of a transmission channel to a particular route is favoured.

4. A network as defined in claim 1, wherein the configuration controller at a particular node is operable:
to receive signals comprising transmission channel allocation request messages from the ABUD; and
to process the received transmission channel allocation request messages to determine that allocation of a transmission channel to a particular route is favoured.

5. A network as defined in claim 3 or claim 4, wherein the configuration controller at the particular node is operable to determine a possible path for the transmission channel to be allocated.

6. A network as defined in claim 4, wherein:
the configuration controller at the particular node comprises a storage device for storing a map of network connectivity; and
the configuration controller at the particular node is operable to consult the map of network connectivity to determine the possible path for the transmission channel to be allocated.

7. A network as defined in claim 5, wherein the configuration controller at the particular node is operable:
to send transmission channel allocation request messages to configuration controllers at other nodes on the possible path;
to receive reply messages from the configuration controllers at other nodes on the possible path, the reply messages indicating whether the transmission channel can be allocated at the other nodes; and
in response to reply messages indicating that the transmission channel can be allocated at all other nodes on the possible path, to communicate with the switch, configuration controllers at other nodes and the ABUD to implement allocation of the transmission channel to the particular route.

8. A network as defined in claim 4, wherein the configuration controller at the particular node is operable:
to send transmission channel allocation request messages to configuration controllers at other nodes on the possible path;
to receive reply messages from the configuration controllers at other nodes on the possible path, the reply messages indicating whether the transmission channel can be allocated at the other nodes; and
in response to a reply message indicating that the transmission channel can be allocated at an adjacent node on the possible path, to communicate with the switch, the configuration controller at the adjacent node and the ABUD to implement allocation of the transmission channel to the particular route between the particular node and the adjacent node.

9. A network as defined in claim 1, wherein a configuration controller at a particular node is operable to communicate with configuration controllers at other nodes according to a connection-oriented protocol:
to temporarily reserve available transmission channels on a span-by-span basis until transmission channels are reserved for an entire end-to-end path; and
to book for use the temporarily reserved transmission channels upon confirmation that available transmission channels are reserved for the entire end-to-end path.

10. A network as defined in claim 1, wherein said buffer statistics comprise data selected from the group consisting of buffer fill levels, buffer rates of fill and numbers of buffer overflows.

11. A network node for a communications network, comprising:
at least one Agile Bandwidth Usage Device (ABUD);
a switch connected to the ABUD for configuring transmission channels connected to other nodes; and
a configuration controller connected to the ABUD and to the switch for controlling configuration of the transmission channels, the configuration controller being operable:
to receive from the ABUD butter statistics characterizing the fill of buffers connected to output ports of the ABUD;
to process the received buffer statistics to determine that a modified allocation of the transmission channels Is favoured and to determine a favoured modified allocation of the transmission channels;
to communicate with configuration controllers at other nodes to determine a path between nodes for implementation of the favoured modified allocation of the transmission channels; and
to communicate with the switch, configuration controllers at other nodes and the ABUD to implement the favoured modified allocation of the transmission channels according to the determined path.

12. A network node as defined in claim 11, wherein the ABUD is selected from a group consisting of routers, data switches and servers.

13. A network node as defined in claim 11, wherein the configuration controller is operable:
to receive signals comprising traffic data from the ABUD; and
to process the received traffic data to determine that allocation of a transmission channel to a particular route is favoured.

14. A network node as defined in claim 11, wherein the configuration controller is operable:
to receive signals comprising transmission channel allocation request messages from the ABUD; and
to process the received transmission channel allocation request messages to determine that allocation of a transmission channel to a particular route is favoured.

15. A network node as defined in claim 13 or claim 14, wherein the configuration controller is operable to determine a possible path for the transmission channel to be allocated.

16. A network node as defined in claim 15, wherein:
the configuration controller comprises a storage device for storing a map of network connectivity; and
the configuration controller is operable to consult the map of network connectivity to determine the possible path for the transmission channel to be allocated.

17. A network node as defined in claim 15, wherein the configuration controller is operable:
to send transmission channel allocation request messages to configuration controllers at other nodes on the possible path;

to receive reply messages from the configuration controllers at other nodes on the possible path, the reply messages indicating whether the transmission channel can be allocated at the other nodes; and in response to reply messages indicating that the transmission channel can be allocated at all other nodes on the possible path, to communicate with the switch, configuration controllers at other nodes and the ABUD to implement allocation of the transmission channel to the particular route.

18. A network node as defined in claim 14, wherein the configuration controller is operable:

to send transmission channel allocation request messages to configuration controllers at other nodes on the possible path;

to receive reply messages from the configuration controllers at other nodes on the possible path, the reply messages indicating whether the transmission channel can be allocated at the other nodes, and in response to a reply message indicating that the transmission channel can be allocated at an adjacent node on the possible path, to communicate with the switch, the configuration controller at the adjacent node and the ABUD to implement allocation of the transmission channel to the particular route between the particular node and the adjacent node.

19. A network node as defined in claim 11, wherein the configuration controller is operable to communicate with configuration controllers at other nodes according to a connection-oriented protocol:

to temporarily reserve available transmission channels on a span-by-span basis until transmission channels are reserved for an entire end-to-end path; and to book for use the temporarily reserved transmission channels upon confirmation that available transmission channels are reserved for the entire end-to-end path.

20. A network node as defined in claim 11, wherein said buffer statistics comprise data selected from the group consisting of buffer fill levels, buffer rates of till and numbers of buffer overflows.

21. A network node as defined in claim 11, wherein the configuration controller is operable:

to identify a network path to which a port having unfavourable buffer statistics belongs;

to assess buffer fill statistics for other ports in the identified network path; and to determine a favoured reconfiguration of the transmission channels based on the buffer fill statistics for multiple ports in the identified network path.

22. A communications network, comprising a plurality of interconnected nodes, each of the plurality of said nodes comprising:

at least one Agile Bandwidth Usage Device (ABUD);

a switch connected to the ABUD for configuring transmission channels connected to other nodes; and a configuration controller connected to the ABUD and to the switch for controlling configuration of the transmission channels, the configuration controller comprising a storage device for storing policy rules; and being operable:

to download policy rules from a central management system;

to receive from the ABUD buffer statistics characterizing the fill of buffers connected to output ports of the ABUD;

to apply the policy rules in processing the received buffer statistics to determine that allocation of a transmission channel to a particular route is favoured;

to communicate with configuration controllers at other nodes to determine a path between nodes for implementation of the favoured allocation of the transmission channel to a particular route; and to communicate with the switch configuration controllers at other nodes and the ABUD to implement the favoured allocation of the transmission channel.

23. A network node for a communications network comprising:

at least one Agile Bandwidth Usage Device (ABUD);

a switch connected to the ABUD for configuring transmission channels connected to other nodes; and a configuration controller connected to the ABUD and to the switch for controlling configuration of the transmission channels, the configuration controller comprising a storage device for storing policy rules and being operable;

to download policy rules from a central management system;

to receive from the ABUD buffer statistics characterizing the fill of buffers connected to output ports of the ABUD;

to apply the policy rules in processing the received buffer statistics to determine that allocation of a transmission channel to a particular route is favoured;

to communicate with configuration controllers at other nodes to determine a path between nodes for implementation of the favoured allocation of the transmission channel to a particular route; and to communicate with the switch, configuration controllers at other nodes and the ABUD to implement the favoured allocation of the transmission channel.

24. A configuration controller, communicating with an Agile Bandwidth Usage Device (ABUD) requiring allocated transmission channels and a switch connected to the ABUD at a network node to configure transmission channels connected to other nodes of the network, the configuration controller comprising:

at least one processor; and at least one storage device connected to the at least one processor, the storage device storing instructions for execution by the processor and storing policy rules, the instructions comprising instructions for;

downloading policy rules from a central management system;

receiving from the ABUD buffer statistics characterizing the fill of buffers connected to output ports of the ABUD;

applying the policy rules in processing the received buffer statistics to determine that allocation of a transmission channel to a particular route is favoured;

communicating with configuration controllers at other nodes to determine a path between nodes for implementation of the favoured allocation of a transmission channel; and communicating with the switch, configuration controllers at other nodes and the ABUD to implement the favoured allocation of the transmission channel.

25. A configuration controller for communicating with an Agile Bandwidth Usage Device (ABUD) requiring allocated transmission channels and a switch connected to the ABUD at a network node to configure transmission channels connected to other nodes of the network, the configuration controller comprising:
  at least one processor; and
  at least one storage device connected to the at least one processor, the storage device storing instructions for execution by the processor, the instructions comprising instructions for:
    receiving from the ABUD buffer statistics characterizing the fill of buffers connected to output ports of the ABUD;
    processing the received buffer statistics to determine that a modified allocation of the transmission channels is favoured and to determine a favoured modified allocation of the transmission channels;
    communicating with configuration controllers at other nodes to determine a path between nodes for implementation of the favoured modified allocation of the transmission channels; and
    communicating with the switch, configuration controllers at other nodes and the ABUD to implement the favoured modified allocation of the transmission channels according to a determined oath.

26. A configuration controller as defined in claim 25, wherein the instructions comprise:
  instructions for determining that a transmission channel is underutilized; and
  instructions for communicating with the switch, configuration controllers at other nodes and the ABUD to reallocate the underutilized transmission channel to a pool of spare transmission channels.

27. A configuration controller as defined in claim 25, wherein the instructions comprise instructions for:
  receiving signals comprising traffic data from the ABUD; and
  processing the received traffic data to determine that allocation of a transmission channel to a particular route is favoured.

28. A configuration controller as defined in claim 25, wherein the instructions comprise instructions for:
  receiving signals comprising transmission channel allocation request messages from the ABUD; and
  processing the received transmission channel allocation request messages to determine that allocation of a transmission channel to a particular route is favoured.

29. A configuration controller as defined in claim 27, or claim 28, wherein the instructions comprise instructions for determining a possible path for the transmission channel to be allocated.

30. A configuration controller as defined in claim 29, comprising a storage device for storing a map of network connectivity, wherein the instructions comprise instructions for consulting the map of network connectivity to determine the possible path for the transmission channel to be allocated.

31. A configuration controller as defined in claim 29, wherein the instructions comprise instructions for:
  sending transmission channel allocation request messages to configuration controllers at other nodes on the possible path;
  receiving reply messages from the configuration controllers at other nodes on the possible path, the reply messages indicating whether the transmission channel can be allocated at the other nodes; and
  in response to reply messages indicating that the transmission channel can be allocated at all other nodes on the possible path, communicating with the switch, configuration controllers at other nodes and the ABUD to implement allocation of the transmission channel to the particular route.

32. A configuration controller as defined in claim 28, wherein the instructions comprise instructions for:
  sending transmission channel allocation request messages to configuration controllers at other nodes on the possible path;
  receiving reply messages from the configuration controllers at other nodes on the possible path, the reply messages indicating whether the transmission channel can be allocated at the other nodes; and
  in response to a reply message indicating that the transmission channel can be allocated at an adjacent node on the possible path, communicating with the switch, the configuration controller at the adjacent node and the ABUD to implement allocation of the transmission channel to the particular route between the particular node and the adjacent node.

33. A configuration controller as defined in claim 25, wherein the instructions comprise instructions for communicating with configuration controllers at other nodes according to a connection-oriented protocol:
  to temporarily reserve available transmission channels on a span-by-span basis until transmission channels are reserved for an entire end-to-end path; and
  to book for use the temporarily reserved transmission channels upon confirmation that available transmission channels are reserved for the entire end-to-end path.

34. A configuration controller as defined in claim 25, wherein said buffer statistics comprise data selected from the group consisting of buffer fill levels, buffer rates of fill and numbers of buffer overflows.

35. A configuration controller as defined in claim 25, wherein the instructions comprise instructions for:
  identifying a network path to which a port having unfavourable buffer statistics belongs;
  assessing buffer fill statistics for other ports in the identified network path; and
  determining a favoured reconfiguration of the transmission channels based on the buffer fill statistics for multiple ports in the identified network path.

36. A processor readable medium storing instructions for execution by a configuration controller for communicating with an Agile Bandwidth Usage Device (ABUD) requiring allocated transmission channels and a switch connected to the ABUD at a network node to configure transmission channels connected to other nodes of the network, the instructions comprising instructions for:
  downloading policy rules from a central management system;
  receiving from the ABUD buffer statistics characterizing the fill of buffers connected to output ports of the ABUD;
  applying the policy rules in processing the received buffer statistics to determine that allocation of a transmission channel to a particular route is favoured;
  communicating with configuration controllers at other nodes to determine a path between nodes for implementation of the favoured allocation of a transmission channel; and
  communicating with the switch, configuration controllers at other nodes and the ABUD to implement the favoured allocation of the transmission channel.

37. A processor readable medium storing instructions for execution by a configuration controller for communicating with an Agile Bandwidth Usage Device (ABUD) requiring allocated transmission channels and a switch connected to the ABUD at a network node to configure transmission channels connected to other nodes of the network, the instructions comprising instructions for:

receiving from the ABUD buffer statistics characterizing the fill of buffers connected to output ports of the ABUD;

processing the received buffer statistics to determine that a modified allocation of the transmission channels is favoured and to determine a favoured modified allocation of the transmission channels;

communicating with configuration controllers at other nodes to determine a path between nodes for implementation of the favoured modified allocation of the transmission channels; and communicating with the switch, configuration controllers at other nodes and the ABUD to implement the favoured modified allocation of the transmission channels according to a determined path.

38. A medium as defined in claim 37, wherein the instructions comprise:

instructions for determining that a transmission channel is underutilized; and instructions for communicating with the switch, configuration controllers at other nodes and the ABUD to reallocate the underutilized transmission channel to a pool of spare transmission channels.

39. A medium as defined in claim 37, wherein the instructions comprise instructions for:

receiving signals comprising traffic data from the ABUD; and processing the received traffic data to determine that allocation of a transmission channel to a particular route is favoured.

40. A medium as defined in claim 31, wherein the instructions comprise instructions for:

receiving signals comprising transmission channel allocation messages from the ABUD; and processing the received transmission channel allocation request messages to determine that allocation of a transmission channel to a particular route is favoured.

41. A medium as defined in claim 39, or claim 40, wherein the instructions comprise instructions for determining a possible path for the transmission channel to be allocated.

42. A medium as defined in claim 41, wherein the instructions comprise instructions for consulting a map of network connectivity to determine the possible path for the transmission channel to be allocated.

43. A medium as defined in claim 41, wherein the instructions comprise instructions for:

sending transmission channel allocation request messages to configuration controllers at other nodes on the possible path;

receiving reply messages from the configuration controllers at other nodes on the possible path, the reply messages indicating whether the transmission channel can be allocated at the other nodes; and in response to reply messages indicating that the transmission channel can be allocated at all other nodes on the possible path, communicating with the switch, configuration controllers at other nodes and the ABUD to implement allocation of the transmission channel to the particular route.

44. A medium as defined in claim 40, wherein the instructions comprise instructions for:

sending transmission channel allocation request messages to configuration controllers at other nodes on the possible path;

receiving reply messages from the configuration controllers at other nodes on the possible path, the reply messages indicating whether the transmission channel can be allocated at the other nodes; and in response to a reply message indicating that the transmission channel can be allocated at an adjacent node on the possible path, communicating with the switch, the configuration controller at the adjacent node and the ABUD to implement allocation of the transmission channel to the particular route between the particular node and the adjacent node.

45. A medium as defined in claim 37, wherein the instructions comprise instructions for communicating with configuration controllers at other nodes according to a connection-oriented protocol:

to temporarily reserve available transmission channels on a span-by span basis until transmission channels are reserved for an entire end-to-end path; and to book for use the temporarily reserved transmission channels upon confirmation that available transmission channels are reserved for the entire end-to-end path.

46. A medium as defined in claim 37, wherein said buffer statistics comprise data selected from the group consisting of buffer fill levels, buffer rates of fill and numbers of buffer overflows.

47. A medium as defined in claim 37, wherein the instructions comprise instructions for:

identifying a network path to which a port having unfavourable buffer statistics belongs;

assessing buffer fill statistics for other ports in the identified network path; and determining a favoured reconfiguration of the transmission channels based on the buffer fill statistics for multiple ports in the identified network path.

48. A method for operating a configuration controller at a node in a communications network for communicating with an Agile Bandwidth Usage Device (ABUD) requiring allocated transmission channels and a switch connected to the ABUD at a network node to configure transmission channels connected to other nodes of the network, the method comprising:

receiving from the ABUD buffer statistics characterizing the fill of buffers connected to output ports of the ABUD;

processing the received buffer statistics to determine that a modified allocation of the transmission channels is favoured and to determine a favoured modified allocation of the transmission channels;

communicating with configuration controllers at other nodes to determine a paths between nodes for implementation of the favoured modified allocation of the transmission channels; and communicating with the switch, configuration controllers at other nodes and the ABUD to implement the favoured modified allocation of the transmission channels according to the determined path.

49. A method as defined in claim 48, comprising:

determining that a transmission channel is underutilized; and communicating with the switch, configuration controllers at other nodes and the ABUD to reallocate the underutilized transmission channel to a pool of spare transmission channels.

50. A method as defined in claim 48, comprising:

receiving signals comprising traffic data from the ABUD; and processing the received traffic data to determine that allocation of a transmission channel to a particular route is favoured.

51. A method as defined in claim 48, comprising:

receiving signals comprising transmission channel allocation request messages from the ABUD; and processing the received transmission channel allocation request messages to determine that allocation of a transmission channel to a particular route is favoured.

52. A method as defined in claim 50 or claim 51, comprising determining a possible path for the transmission channel to be allocated.

53. A method as defined in claim 52, comprising consulting a map of network connectivity to determine the possible path for the transmission channel to be allocated.

54. A method as defined in claim 52, comprising:

sending transmission channel allocation request messages to configuration controllers at other nodes on the possible path;

receiving reply messages from the configuration controllers at other nodes on the possible path, the reply messages indicating whether the transmission channel can be allocated at the other nodes; and in response to reply messages indicating that the transmission channel can be allocated at all other nodes on the possible path, communicating with the switch, configuration controllers at other nodes and the ABUD to implement allocation of the transmission channel to the particular route.

55. A method as defined in claim 51, comprising:

sending transmission channel allocation request messages to configuration controllers at other nodes on the possible path;

receiving reply messages from the configuration controllers at other nodes on the possible path, the reply messages indicating whether the transmission channel can be allocated at the other nodes; and in response to a reply message indicating that the transmission channel can be allocated at an adjacent node on the possible path, communicating with the switch, the configuration controller at the adjacent node and the ABUD to implement allocation of the transmission channel to the particular route between the particular node and the adjacent node.

56. A method as defined in claim 48, comprising communicating with configuration controllers at other nodes according to a connection-oriented protocol:

to temporarily reserve available transmission channels on a span-by-span basis until transmission channels are reserved for an entire end-to-end path; and to book for use the temporarily reserved transmission channels upon confirmation that available transmission channels are reserved for the entire end-to-end path.

57. A method as defined in claim 48, wherein said buffer statistics comprise data selected from the group consisting of buffer fill levels, buffer rates of fill and numbers of buffer overflows.

58. A method for operating a configuration controller at a node in a communications network for communicating with an Agile Bandwidth Usage Device (ABUD) requiring allocated transmission channels and a switch connected to the ABUD at a network node to configure transmission channels connected to other nodes of the network, the method comprising:

downloading policy rules from a central management system; end receiving from the ABUD buffer statistics characterizing the fill of buffers connected to output ports of the ABUD;

applying the policy rules in processing the received buffer statistics to determine that allocation of a transmission channel to a particular route is favoured;

communicating with configuration controllers at other nodes to determine a path between nodes for implementation of the favoured allocation of a transmission channel; and communicating with the switch, configuration controllers at other nodes and the ABUD to implement the favoured allocation of the transmission channel.

59. A communications network, comprising a plurality of interconnected nodes, each of the plurality of said nodes comprising:

at least one Agile Bandwidth Usage Device (ABUD);

a switch connected to the ABUD for configuring transmission channels connected to other nodes; and a configuration controller connected to the ABUD and to the switch for controlling configuration of the transmission channels, the configuration controller being operable:

to receive from the ABUD buffer statistics characterizing the fill of buffers connected to output ports of the ABUD;

to apply network traffic policy rules to the received buffer statistics to determine that a modified allocation of the transmission channels is favoured and to determine a favoured modified allocation of the transmission channels:

to communicate with configuration controllers at other nodes to determine a path between nodes for Implementation of the favoured modified allocation of the transmission channels; and to communicate with the switch, configuration controllers at other nodes and the ABUD to implement the favoured modified allocation of the transmission channels according to the determined path.

60. A network as defined in claim 59, wherein the configuration controller is operable:

to identify a network path to which a port having unfavourable buffer statistics belongs;

to assess buffer fill statistics for other ports in the identified network path; and to determine a favoured reconfiguration of the transmission channels based on the buffer fill statistics for multiple ports in the identified network path.

61. A network node for a communications network, comprising:

at least one Agile Bandwidth Usage Device (ABUD);

a switch connected to the ABUD for configuring transmission channels connected to other nodes; and a configuration controller connected to the ABUD and to the switch for controlling configuration of the transmission channels, the configuration controller being operable:

to receive from the ABUD buffer statistics characterizing the fill of buffers connected to output ports of the ABUD;

to apply network traffic policy rules to the received buffer statistics to determine that a modified allocation of the transmission channels is favoured and to determine a favoured modified allocation of the transmission channels;

to communicate with configuration controllers at other nodes to determine a oaths between nodes for implementation of the favoured modified allocation of the transmission channels; and to communicate with the switch, configuration controllers at other nodes and the ABUD to implement the favoured modified allocation of the transmission channels according to the determined path.

62. A configuration controller for communicating with an Agile Bandwidth Usage Device (ABUD) requiring allocated transmission channels and a switch connected to the ABUD at a network node to configure transmission channels connected to other nodes of the network, the configuration controller comprising:

at least one processor; and at least one storage device connected to the at least one processor, the storage device storing instructions for execution by the processor, the instructions comprising instructions for:

receiving from the ABUD buffer statistics characterizing the fill of buffers connected to output ports of the ABUD;

applying network traffic policy rules to the received buffer statistics to determine that a modified allocation of the transmission channels is favoured and to determine a favoured modified allocation of the transmission channels;

communicating with configuration controllers at other nodes to determine a oath between nodes for implementation of the favoured modified allocation of the transmission channels; and communicating with the switch, configuration controllers at other nodes and the ABUD to implement the favoured modified allocation of the transmission channels according to the determined path.

63. A processor readable medium storing instructions for execution by a configuration controller for communicating with an Agile Bandwidth Usage Device (ABUD) requiring allocated transmission channels and a switch connected to the ABUD at a network node to configure transmission channels connected to other nodes of the network, the instructions comprising instructions for:

receiving from the ABUD buffer statistics characterizing the fill of buffers connected to output ports of he ABUD;

applying network traffic policy rules to the received buffer statistics to determine that a modified allocation of the transmission channels is favoured and to determine a favoured modified allocation of the transmission channels;

communicating with configuration controllers at other nodes to determine a path between nodes for implementation of the favoured modified allocation of the transmission channels; and communicating with the switch,configuration controllers at other nodes and the ABUD to implement the favoured modified allocation of the transmission channels according to the determined path.

64. A method for operating a configuration controller at a node in a communications network for communicating with an Agile Bandwidth Usage Device (ABUD) requiring allocated transmission channels and a switch connected to the ABUD at a network node to configure transmission channels connected to other nodes of the network, the method comprising:

receiving from the ABUD buffer statistics characterizing the fill of buffers connected to output ports of the ABUD;

applying network traffic policy rules to the received buffer statistics to determine that a modified allocation of the transmission channels is favoured favoured and to determine a favoured modified allocation of the transmission channels:

communicating with configuration controllers at other nodes to determine a oath between nodes for implementation of the favoured modified allocation of the transmission channels; and communicating with the switch, configuration controllers at other nodes and the ABUD to implement the favoured modified allocation of the transmission channels according to the determined path.

65. A method as defined in claim 64, wherein further comprising:

identifying a network path to which a port having unfavourable buffer statistics belongs;

assessing buffer fill statistics for other ports in the identified network path; and determining a favoured reconfiguration of the transmission channels based on the buffer fill statistics for multiple ports in the identified network path.

* * * * *